US008715395B2

(12) United States Patent
Omary et al.

(10) Patent No.: US 8,715,395 B2
(45) Date of Patent: *May 6, 2014

(54) FLUORINATED METAL-ORGANIC FRAMEWORKS FOR HYDROCARBON STORAGE

(75) Inventors: Mohammad A. Omary, Denton, TX (US); Chi Yang, Denton, TX (US)

(73) Assignee: University of North Texas, Denton, TX (US)

(*) Notice: Subject to any disclaimer, the term of this patent is extended or adjusted under 35 U.S.C. 154(b) by 71 days.

This patent is subject to a terminal disclaimer.

(21) Appl. No.: 13/269,451

(22) Filed: Oct. 7, 2011

(65) Prior Publication Data
US 2012/0118153 A1 May 17, 2012

Related U.S. Application Data

(63) Continuation-in-part of application No. 12/676,555, filed as application No. PCT/US2008/010664 on Sep. 12, 2008, now Pat. No. 8,343,260.

(60) Provisional application No. 60/993,844, filed on Sep. 14, 2007.

(51) Int. Cl.
*C07F 1/10* (2006.01)
*B01J 20/22* (2006.01)

(52) U.S. Cl.
USPC ................................ 95/143; 95/147; 548/101

(58) Field of Classification Search
USPC .......... 96/108; 95/90, 143, 147, 144; 206/0.7; 502/400; 548/101
See application file for complete search history.

(56) References Cited

U.S. PATENT DOCUMENTS 7,553,352 B2* 6/2009 Mueller et al. ............... 95/90
7,910,732 B2* 3/2011 Schubert et al. ............. 544/226
2010/0132549 A1* 6/2010 Yaghi et al. .................. 95/128

OTHER PUBLICATIONS

Yang G. et al: "A Robust, Porous, Cationic Silver(I) 3,5-Diphenyl-1,2,4-Triazolate Framework with a Uninodal 4<9>.6<6> Net" Chemical Communications, Royal Society of Chemistry, GB, vol. 10, No. 18, Jan. 2004, pp. 2058-2059.*
Abdul-Ghani, M.M., et al; Unsaturated Nitrogen Compounds Containing Fluorine; J. Fluo. Chem. 1995, 72, 95-106.
Dinca, M., et al., Hydrogen Storage in a Microporous Metal-Organic Framework With Exposed MN2+ Coordination Sites; J. Am. Chem. Soc. 2006, 128, 16876-16883.
Ouellette, W., et al; Hydrothermal Chemistry of the Copper-Triazolate System, J. Angew. Chem. Int. Ed. 2006, 45, 3497-3500.

(Continued)

*Primary Examiner* — Frank Lawrence, Jr.
(74) *Attorney, Agent, or Firm* — Jackson Walker L.L.P.

(57) ABSTRACT

Fluorinated metal-organic frameworks ("FMOFs") are capable of adsorbing and desorbing hydrocarbons, namely, C6-C8 hydrocarbon oil components (n-hexane, cyclohexane, benzene and toluene). FMOFs can be arranged in a variety of configurations and have internal hollow channels and cavities. In FMOFs, hydrogen atoms have been substituted completely or partially with fluorine atoms or fluorinated groups in each linking organic ligand. These FMOFs can adsorb C6-C8 hydrocarbons, up to 500 kg/m$^3$ as demonstrated for toluene, through a combination of superhydrophobicity and capillary action. No water adsorption was detectable even under extreme conditions including moist air near 100% relative humidity and immersion in water for multiple weeks, demonstrating far superior water resistance to BPL carbon and zeolites. These materials are stable and can be readily recycled by simple desorption many times. The FMOFs have applications in removal or containment of organics, particularly in the fields of oil spill cleanup and hydrocarbon storage.

14 Claims, 21 Drawing Sheets

(56) References Cited

OTHER PUBLICATIONS

Spek, A. L.; Single-Crystal Structure Validation With the Program Platon; J. Appl. Crystallogr. 2003, 36, 7-13.

Yaghi, O. M., et al; Selective Binding and Removal of Guests in a Microporous Metal-Organic Framework; Nature 1995, 378, 703-706.

Wong-Foy, A.G., et al.; Exceptional H2 Saturation Uptake in Microporous Metal-Organic Frameworks; J. Am. Chem. Soc. 2006, 128, 3494-3495.

Zhang, J. P., et al; Two Unprecedented 3-Connected Three-Dimensional Networks of Copper Triazolates; Angew. Chem. Int. Ed. 2004, 43, 206-209.

Zhang, J. P., et al; Copper(I) 1,2,4-Trizolates and Related Complexes; J. Am. Chem. Soc. 2005, 127, 5495-5506.

Zhang, J. P., et al; Temperature- or Guest-Induced Drastic Single-Crystal-To-Single-Crystal Transformations of a Nanoporous Coordination Polymer; J. Am. Chem. Soc. 2005, 127, 14162-14163.

European Patent Office; International Search Report and Written Opinion; PCT Application No. PCT/US2008/010664; Jan. 5, 2009.

European Patent Office; International Preliminary Report on Patentability; PCT Application No. PCT/US2008/010664; Dec. 15, 2009.

Yang, Chi, et al; Fluorous Metal-Organic Frameworks for High-Density Gas Adsorption; J. American Chem. Soc.; Dec. 19, 2007, 129, 50, 15454-15455.

Chen, et al; A Self-Assembled Porous Zn(II) Metal-Organic Framework Based on Fluorinated Bis-Pyridinecarboxamide Derivative Ligand; Inorganic Chemistry Communications, Mar. 7, 2007,10, 4, 451-454.

Fasina, T.M, et al; Synthesis, Optical Properties, Crystal Structures and Phase Behaviour . . . , J. Materials Chemistry, Aug. 7, 2004; 14, 15, 2395-2404.

Ferrer, M., et al; Equilibria Between Metallosupramolecular Squares and Triangles . . . , Inorganic Chemistry, Sep. 22, 2003, 42, 19, 5890-5899.

Kasai, K, et al; Flexible Coordination Networks With Fluorinated Backbones; J. American Chem. Soc., Mar. 8, 2000, 122, 9, 2140-2141.

Domasevitch, K.V., et al; Silver(1) Ions Bridged by Pyridazine: Doubling the Ligand Functionality for the Design of Unusual 3D Coordination Frameworks; Dalton Transactions 2007 Royal Soc. of Chem., Jun. 23, 2007, 3893-3905.

Brooks, C.L., et al; Taking a Walk on a Landscape; Science, vol. 293, pp. 612-613, Jul. 27, 2001.

Chandler, David; Two Faces of Water; Nature, vol. 417, p. 491, May 30, 2002.

Desbiens, N., et al; Water Condensation in Hydrophobic Silicalite-1 Zeolite: A Molecular Simulation Study; J. Phys Chem., 109, pp. 24071-24076, Nov. 30, 2005.

Eddaoudi, M., et al; Highly Porous and Stable Metal-Organic Frameworks: Structure Design and Sorption Properties; J. Am. Chem. Soc., 122, pp. 1391-1397, Feb. 4, 2000.

Eddaoudi, M., et al; Modular Chemistry: Secondary Building Units As a Basis for the Design of Highly Porous and Robust Metal-Organic Carboxylate Frameworks: Acc. Chem. Res., 34, 319-330, Feb. 17, 2001.

Larmour, I. A., et al.; Remarkably Simple Fabrication of Superhydrophobic Surfaces Using Electroless Galvanic Deposition; Angew. Chem. Int. Ed.; 46, 1710-1712, Jan. 17, 2007.

Lee, J.Y., et al; Microporous Metal-Organic Frameworks With High Gas Sorption and Separation Capacity; Adv, Funct. Mater., 17, 1255-1262, Apr. 3, 2007.

Li, Jian-Rong, et al.; Ligand Bridging-Angle-Driven Assembly of Molecular Architectures Based on Quadruply Bonded Mo—Mo Dimers; J. Am. Chem. Soc., 132, 17599-17610, Nov. 17, 2010.

Lin, Xiang, et al; A Porous Framework Polymer Based on a Zinc(II) 4,4'-Bipyridine-2,6,2',6'-Tetracarboxylate: Synthesis, Structure, and "Zeo-Like" Behaviors; J. Am. Chem. Soc., 128, 10745-10753, Jul. 29, 2006.

Low, J.J., et al.; Virtual High Throughput Screening Confirmed Experimentally: Porous Coordination Polymer Hydration; J. Am. Chem. Soc., 131, 15834-15842, Oct. 7, 2009.

Moise, J.C, et al; Adsorption of Water Vapor on X and Y Zeolites Exchanged With Barium; Microporous and Mesoporous Materials, 43, 91-101, 2001.

Nishihara, H., et al; Carbon-Coated Mesoporous Silica With Hydrophobicity and Electrical Conductivity; Carbon, 46, 48-53, Nov. 1, 2007.

Ohara, K, et al; Formation of a Thermally Stable, Porous Coordination Network Via a Crystalline-To-Amorphous-To-Crystalline Phase Transition; J. Am. Chem. Soc., 131, 3860-3861, 2009.

Pan, L, et al; Separation of Hydrocarbons With a Microporous Metal-Organic Framework; Angew. Chem. Int. Ed., 45, 616-619, Dec. 15, 2005.

Smit, B., et al; Commensurate 'Freezing' of Alkanes in the Channels of a Zeolite; Nature, 374, 42-44, Mar. 2, 1995.

Taylor, Thomas J., et al; Hydrocarbon Uptake in the Alkylated Micropores of a Columnar Supramolecular Solid; Angew. Chem. Int. Ed., 45, 7030-7033, 2006.

Trung, T.K., et al.; Hydrocarbon Adsorption in the Flexible Metal Organic Frameworks MIL-53 (Al, Cr); J. Am. Chem. Soc., 130, 16926-16932, 2008.

Webster, C.E., et al.; Molecular Dimensions for Adsorptives, 120, 5509-5516, May 22, 1998.

Yang, C., et al.; Crystallographic Observation of Dynamic Gas Adsorption Sites and Thermal Expansion in a Breathable Fluorous Metal-Organic Framework; Angew. Chem. Int. Ed., 48, 2500-2505, 2009.

\* cited by examiner

Scheme 1. General synthetic route for FMOF complexes. Reagents used in different steps are: a. MeOH, $H_2SO_4$; b. $NH_2NH_2$; c. $R_F$-COCl; d. $POCl_3$; e. $NH_3$; f. $P_2O_5$; g. NaH; h. metal precursor ($AgNO_3$ for FMOF-1). $R_F$ represents fluorinated alkyl groups, e.g. $CF_3$, $CF_2CF_3$, $C_3F_7$, $C_4F_9$, $C_5F_{11}$, $C_6F_{13}$, $C_8F_{17}$, etc.

(a)

(b)

(a)  (b)

(a)

(b)

FLUORINATED METAL-ORGANIC FRAMEWORKS FOR HYDROCARBON STORAGE

This application is a continuation-in-part of and claims priority to U.S. patent application Ser. No. 12/676,555 (now U.S. Pat. No. 8,343,260), entitled "FLUORINATED METAL-ORGANIC FRAMEWORKS FOR GAS STORAGE" filed on Jun. 22, 2010 as a 371 Application claiming priority to International Application No. PCT/US2008/010664, filed on Sep. 12, 2008, the entire content of which is hereby incorporated by reference, which claims priority to U.S. Provisional Patent Application Ser. No. 60/993,844, entitled "FLUORINATED METAL-ORGANIC FRAMEWORKS FOR GAS STORAGE" filed on Sep. 14, 2007, the entire content of which is hereby incorporated by reference.

BACKGROUND

This invention pertains to fluorinated metal-organic frameworks having internal channels and cavities in a variety of configurations that are capable of adsorbing hydrocarbons, including typical aromatic and aliphatic oil components. The fluorous metal-organic framewords ("FMOFs") possess fluorine-lined pore surfaces and are superhydrophobic porous materials with high capacity and affinity to $C_6$-$C_8$ hydrocarbons of oil components.

Crystalline porous materials, either with an inorganic or a metal-organic framework ("MOF"), can be used in a range of applications. These include size- and shape-selective catalysis, separations, gas storage, ion-exchange, sensors, and optoelectronics. In particular, stable MOFs with permanent highly-porous channels or cavities have been explored as effective, economic, and safe on-board vehicular gas (hydrogen or methane) storage materials for fuel-cell-driven automobiles. Extensive efforts have been devoted to the rational design and construction of new MOFs with zeolite-like, well-defined, stable and extra large micro or meso pore size channels exhibiting higher or selective gas affinity properties. Pioneered by Yaghi et al., a vast number of organic ligands with a variety of donor groups and over 40 metal cations have been explored in MOF construction (Yaghi, et al. 1995). A few reports on MOFs utilizing non-fluorinated metal triazolates have appeared recently. (Yang, et al. 2004; Zhang, et al. 2004, 2005; Ouellette 2006).

High volumetric capacity is a very significant property for gas storage applications. The U.S. Department of Energy ("DOE") has established a multi-stage target for hydrogen storage capacity in materials, including those materials intended for fuel cell applications. The DOE's 2010 targets for a hydrogen-storage system are an energy density of 7.2 MJ/kg and 5.4 MJ/L. Energy density refers to the amount of usable energy that can be derived from the fuel system. The figures include the weight and size of the container and other fuel-delivery components not just the fuel. The 2010 values work out to be 6 wt % of hydrogen and 45 kg of hydrogen per cubic meter. For 2015, the DOE is calling for fuel systems with 9 wt % of hydrogen and 81 kg of hydrogen per cubic meter, which is greater than the density of liquid hydrogen (approximately 70 kg/m$^3$ at 20 K and 1 atm). Particularly for $H_2$ storage in automobiles, the volumetric capacity is arguably more important than the gravimetric capacity because smaller heavy cylinders are easier to accommodate in vehicles than larger cylinders even if the latter were lighter than the former. Due to their high porosity, the best metal-organic frameworks known to date have very low densities (e.g., 0.43, 0.51, and 0.62) (Yaghi, et al. 2006; Long, et al. 2006). Therefore, their volumetric densities are always lower than the gravimetric densities.

In attempts to meet the DOE targets, nanostructured carbon materials (e.g. carbon nanotubes, graphite nanofibers, activated carbon, and graphite) and porous metal-organic frameworks have become of interest to researchers as potential hydrogen adsorbents. However, it has been shown that nanostructured carbons have slow uptake, exhibit irreversible adsorption, and contain reduced transition metals as impurities. Meanwhile, the known MOFs have low volumetric $H_2$ uptake due to their low densities and weak affinity to hydrogen molecules. In addition, the porous nature and high surface areas of metal-organic frameworks give rise to rather weak $H_2$ adsorption energies (~5 kJ/mol). This is why cryogenic temperatures are usually required to observe significant $H_2$ uptake.

Oil and petroleum products (hydrocarbons) are some of the most important energy sources in the world. As long as oil is prospected, transported, stored and used, there be a risk of spillages that may result in significant environmental damage and vast economic loss. It is estimated that the oil spill clean-up costs worldwide amount to over $10 billion dollars annually. The adverse impacts to ecosystems and the long-term effects of environmental pollution by these and other releases call for an urgent need to develop a wide range of materials for cleaning up oil from impacted areas, especially because the effectiveness of oil treatment varies with time, type of oil and spill, location and weather conditions. There are many adsorbents in use for oil spill cleanup, including sand, organo-clays and cotton fibers. These adsorbents, however, have strong affinity to water, limiting their effectiveness in cleanup operations. Therefore, the development of waterproof sorbents that are effective even at very low concentrations of oil residue remains an urgent challenge. The Deepwater Horizon oil spill devastation in the Gulf of Mexico has raised awareness and urgent need for water-stable and waterproof sorbent materials that can completely and effectively clean up the oil residue present in water, land and air.

Metal-organic frameworks (MOFs) are promising adsorbents for many guest molecules, although reports concerning adsorption of hydrocarbons (organic vapor) in MOFs remain scarce compared to their $H_2$, $CO_2$, and inert gas adsorption. The high affinity and reactivity of many common MOF materials toward water and humid air largely limits their open-air applications. Thus, the search for water-stable and waterproof (superhydrophobic) MOF materials with the desirable combination of good thermal stability, high selectivity and excellent recyclability is a major challenge and of great technological importance for oil spill cleanup, hydrocarbon storage in a solid matrix to allow transportation in smaller and safer vehicles, catalysis, water purification, component and isomer separation from gasoline mixtures, and environmental remediation of greenhouse gases.

SUMMARY

The present invention relates generally to fluorinated metal-organic frameworks ("FMOFs") having enhanced hydrocarbon adsorption capabilities. All ligands in the FMOFs contain fluorine atoms instead of some or all of the hydrogen atoms in each ligand. In a preferred embodiment, the present invention pertains to fluorous (i.e., perfluorinated) metal-organic frameworks, wherein all hydrogen atoms are substituted by fluorine atoms. Compared to their non-fluorinated counterparts, FMOFs with fluoro-lined or fluoro-coated channels or cavities are expected to possess enhanced thermal stability, higher catalytic activity, higher gas affinity and selectivity, and higher stability to oxidation and light.

In addition, fluorination may impart a variety of new functional properties to MOFs, such as superacidity, enhanced hydrophobicity, low surface energy and surface tension, low refractive index, exceptional chemical and biological inertness, and excellent optical and electrical properties. Many nano-scale fluorous environments have been created mainly via self-assembly processes, including nanoballs, channels, micelles, vesicles, microbubbles, tubules, and hollow fibers. However, porous FMOFs providing a fluorinated pore surface are yet unknown among the wide variety of MOFs.

Embodiments of the FMOFs of the present invention have both large channels and small cavities, both of which are capable of gas adsorption. The channels in representative embodiments of these FMOFs are open in direction of both the a- and b-crystallographic axes such that the gas adsorption sites are interpenetrating. Forming frameworks with narrow pores or cavities helps increase the binding energy of gases to the optimum range (about 15 kcal/mole) and thus facilitate adsorption at higher temperatures. Because the FMOFs, in certain embodiments, have multiple interacting channels and/or cavities whose walls can potentially interact with the same molecules, the sorption processes work cooperatively.

The present FMOFs can selectively adsorb $C_6$-$C_8$ hydrocarbons up to 500 kg/m$^3$ for toluene in preference to water, through a combination of superhydrophobicity and capillary action. Results suggest that the FMOFs represent a promising class of porous materials that should find practical applications in the removal of organics, particularly in the field of oil spill cleanup and hydrocarbon storage. Furthermore, these materials are stable when exposed to water/air and can be readily recycled by simple desorption many times.

DETAILED DESCRIPTION OF PREFERRED EMBODIMENTS

Generally, the present invention relates to a class of neutral, extended nanotubular porous material called "fluorinated metal-organic frameworks" ("FMOFs"), in which all the organic ligands are perfluorinated or partially fluorinated. The fluoro-lined cylindrical channels of the tubular frameworks possess hydrophobic internal cavities as a result of fluorination of all organic ligands.

One embodiment of the present invention pertains to rigid, porous fluorous (i.e., perfluorinated) FMOFs with fluoro-lined channels that are capable of gas adsorption and desorption. All hydrogen atoms in the fluorous FMOFs have been substituted with fluorine atoms. One possible strategy for achieving these fluorous FMOFs uses robust, perfluorinated metal-triazolate clusters as building blocks, which consist of 4-coordinate tetranuclear clusters [$Ag_4L_6$] connected by 3-coordinate Ag(I) centers. Potential candidates for these building blocks include polynuclear silver(I)-triazolate clusters, which bear unsaturated metal sites or exo-N donor atoms; thus, they can readily assemble into coordination polymers with 1D chain, 2D sheet, or 3D framework structures.

Figure 1:
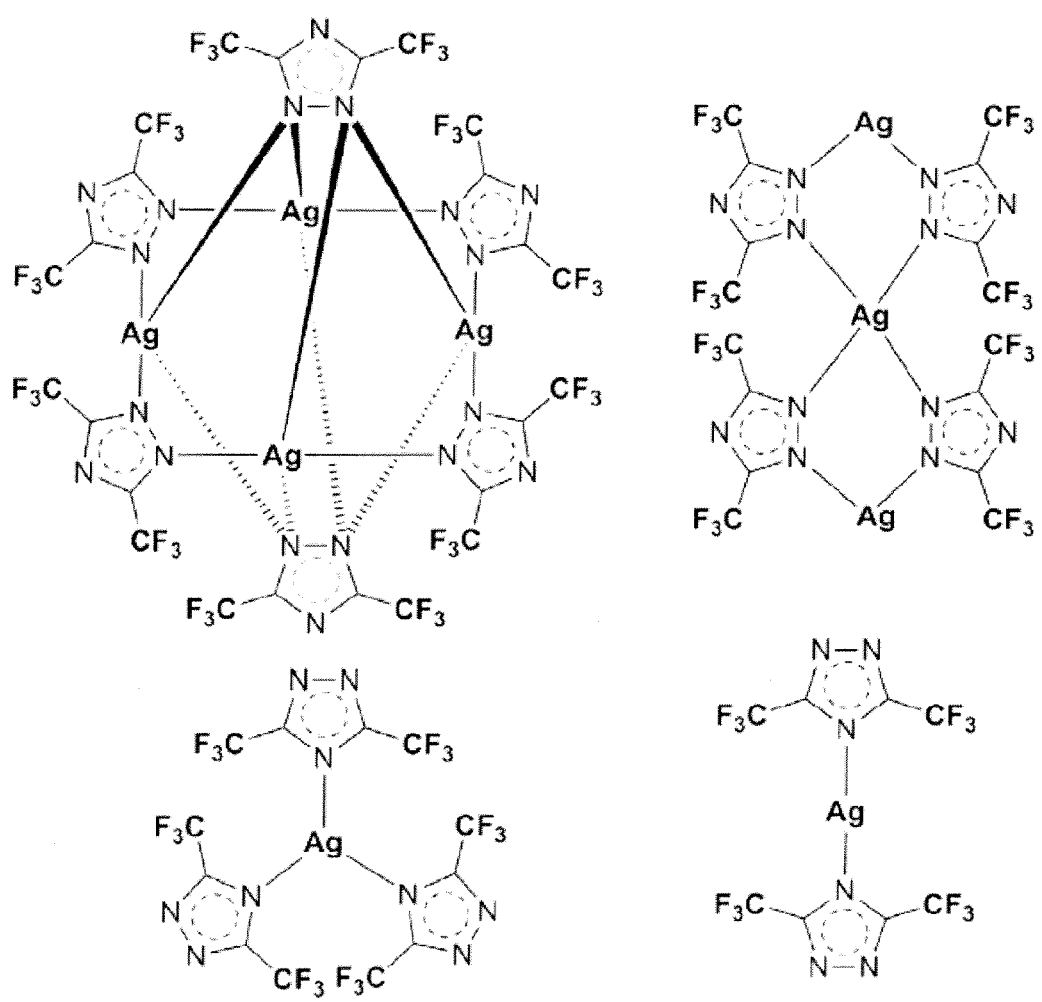
FIG. 1 shows the potential building blocks (top) and coordination environment of Ag+ linkers (bottom) of FMOF-1 (left) and FMOF-2 (right).

The mainly organic and hydrophobic character of the perfluorinated inner surface of FMOFs offers unprecedented potential for enhancing and fine-tuning the affinity for oil adsorbates in the presence of water or moist air. FMOF-1 was the first example of FMOF materials, constructed from silver (I)-3,5-bis(trifluoromethyl-1,2,4-triazolate (AgTz). FMOF-1 and a polymorph thereof, FMOF-2, are superhydrophobic and highly efficient for selective adsorption of typical aromatic and aliphatic oil components. This is a significant finding given that the confinement and interaction of water in hydrophobic space represent an important issue in science and technology that has attracted increasing interest in the past decade, including water adsorption in activated carbons and all-silica zeolites, functionalized or coated mesoporous materials, as well as biological channels. FIG. 1 shows the building blocks (top) and coordination environment of Ag+ linkers (bottom) of FMOF-1 (left) and FMOF-2 (right).

Figure 2:
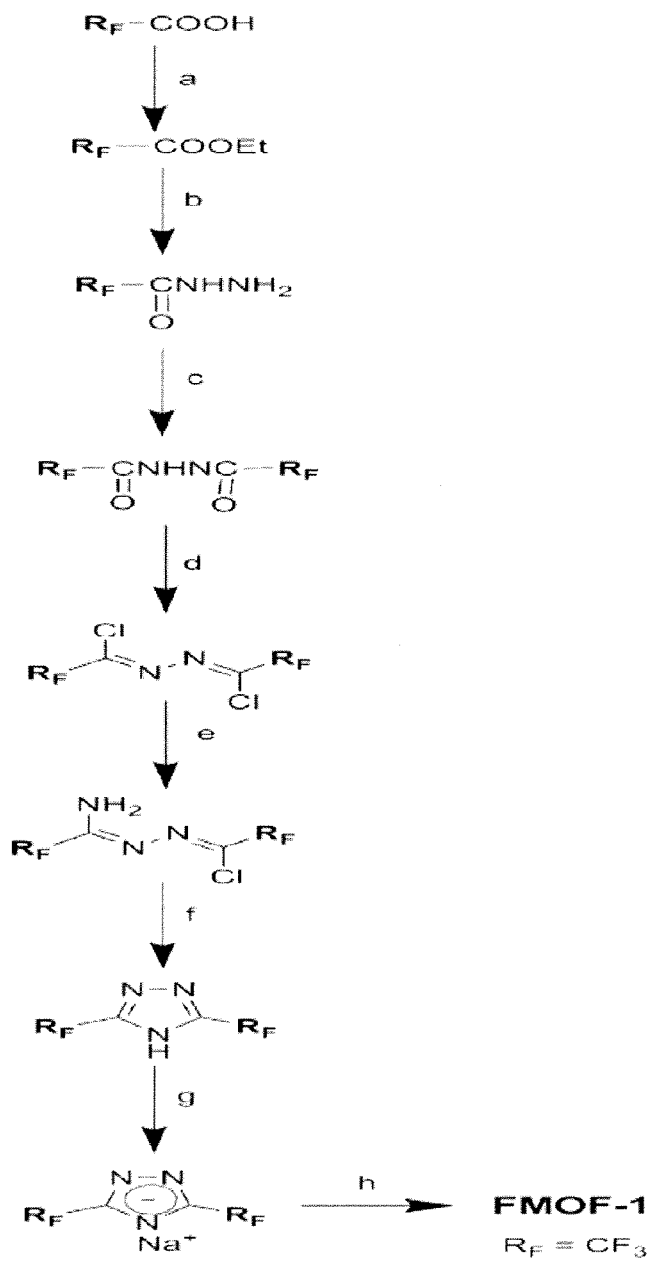
FIG. 2 shows a general synthetic scheme for selected embodiments of the fluorinated metal-organic frameworks ("FMOFs").

Synthesis of particular embodiments of the FMOFs utilizes the perfluorinated ligand 3,5-bis(trifluoromethyl)-1,2,4-triazole ("HL"). HL is synthesized from 2,5-dichloro-1,1,1,6,6,6-hexafluoro-3,4-diazahexa-2,4-diene (Abdul-Ghani, et al. 1995). HL then reacts with silver nitrate in methanol to afford colorless crystals upon evaporation and recrystallization from acetonitrile/toluene. A general synthetic scheme is illustrated in FIG. 2. Synthesis of specific compounds are described in the examples below. These examples and the general synthetic scheme can be used in the synthesis of other fluorinated triazole ligands and related fluorinated metal organic frameworks. For example, $R_F$ in FIG. 2 can have longer fluorinated alkyl groups or fluorinated aromatic groups.

Figure 3:
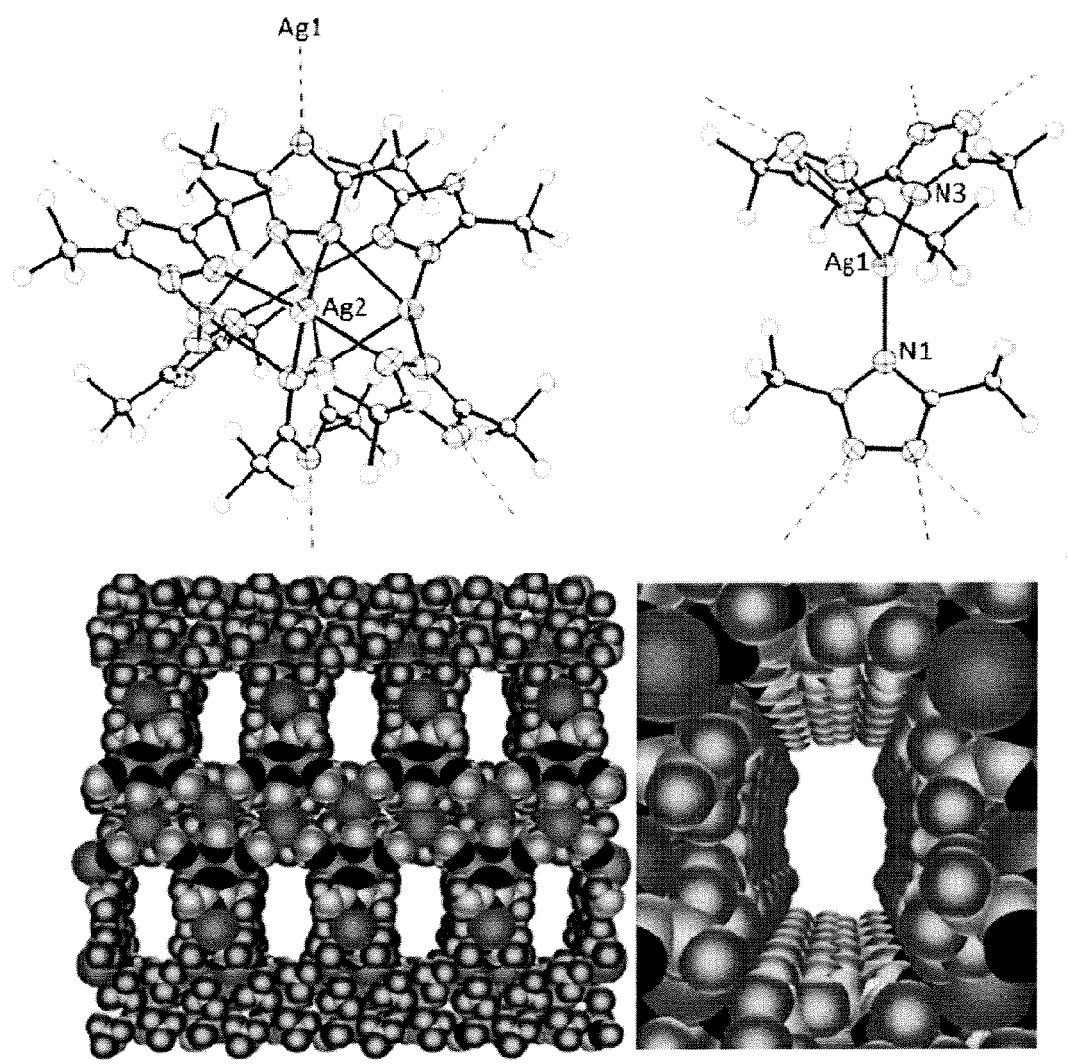
FIG. 3 shows the crystal structure of one embodiment, FMOF-1, at 100 K, with the top figures showing thermal ellipsoidal plots of the building blocks and the bottom figures showing space-filling representations of fluoro-lined 3D channels (left) and a view down one channel (right) of FMOF-1.

Analysis by X-ray crystallography revealed one embodiment, a neutral FMOF with the formula $\{Ag_2[Ag_4L_6]\}_n$, referred to as FMOF-1. The crystal structure of FMOF-1, shown in FIG. 3, shows extended 3D nanotubular open frameworks consisting of 6-connected tetranuclear $[Ag_4L_6]$ clusters linked by 3-coordinate Ag(I) atoms. The crystal data for FMOF-1 are as follows: $C_{24}Ag_6F_{36}N_{18}$, FW=1871.64, Tetragonal, I-42d, a=13.3753(7) Å, c=39.281(4) Å, V=7027.2(9) Å$^3$, Z=4, T=100 K, $D_c$=1.769 g/cm$^3$; $R_1$=0.0473, $wR_2$=0.1420, GOF=1.166.

FIG. 3 shows the structure of FMOF-1 at 100 K. The top figures show 50% thermal ellipsoidal plots of the building blocks, wherein six exo-N atoms of $[Ag_4L_6]$ coordinate to six 3-coordinate Ag(I) centers. The lower figures show space-filling representations of the fluoro-lined 3D channels (left) and a view down one channel (right).

In FMOF-1, the six triazolate ligands utilize their 1- and 2-positioned N-atoms to link four 4-coordinate Ag(I) centers (Avg. Ag—N=2.20(1) Å and 2.64(1) Å for equatorial and axial bonds, respectively) into tetranuclear $[Ag_4L_6]$ clusters (Ag . . . Ag=3.470(1) Å), which utilize their 4-positioned N-atoms to connect to one another via 3-coordinate Ag(I) centers (Avg. Ag—N=2.27(2) Å), generating a 3D framework of $(4^2 \cdot 6)(4^4 \cdot 6^2 \cdot 8^8 \cdot 10)$ topology. The framework can be viewed as consisting of open-ended, hollow tubes extending along the direction of both the a- and b-crystallographic axes with a crystallographically-imposed $S_4$ axis lying at the center of each channel. The cylindrical channels of the tubular framework possess hydrophobic internal cavities, as the $CF_3$ groups of the perfluorinated ligands point into the channels. A cross-section of each fluoro-lined channel in the space-filling representation also shown in FIG. 3 entails a semi-rectangular shape with 12×7.3 Å dimensions. These fluoro-lined channels account for 40.6% of the unit cell volume as calculated by PLATON (Spek, 2003), which is typical for high-porosity MOFs. Residual electron densities were too low (max=0.82 e Å$^{-3}$) to locate possible solvent molecules in the cavities, so it is believed that the best structural refinement entails solvent-free channels. The channels entail hexagonal openings with an Ag . . . Ag distance of 18.7 Å for the longest diagonal of the non-planar 32-membered rings.

As shown in FIG. 3, in the embodiment referred to as FMOF-1, the silver atoms appear to be well protected under the fluorinated walls, imparting unusual air- and photo-stability despite the notoriety of Ag(I) species for being light sensitive. Indeed, FMOF-1 did not change when subjected to UV illumination in air for over 24 hours.

Figure 4:
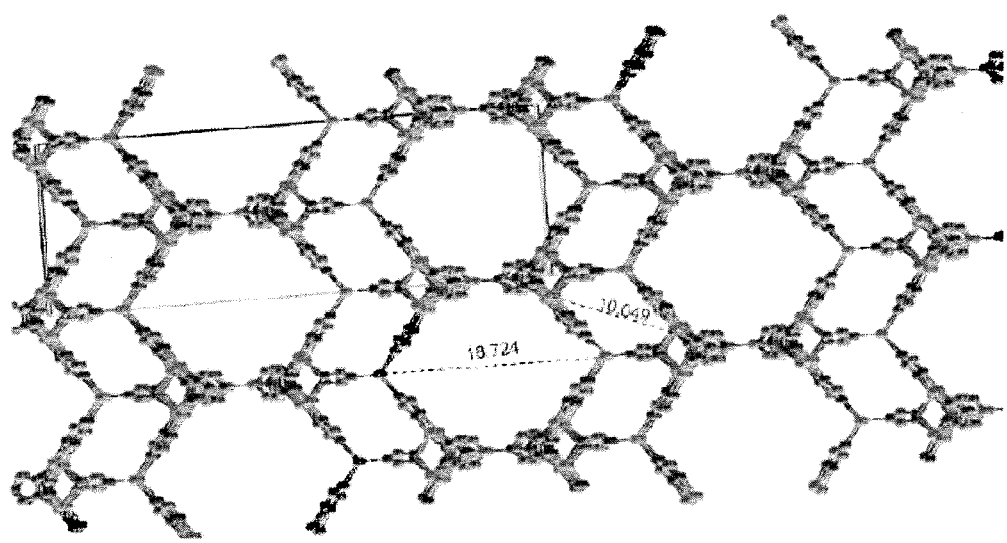
FIG. 4 shows packing diagrams for crystals of one embodiment, FMOF-1, at 100 K, with the top figure showing a ball-and-stick representation with $CF_3$ groups omitted while the bottom figure shows a wireframe representation with all atoms included.

FIG. 4 shows packing diagrams for FMOF-1 crystals at 100 K showing the hexagonal coordination geometry of the non-planar 32-membered rings. The top figure shows a ball-and-stick representation with $CF_3$ groups omitted while the bottom figure shows a wireframe representation with all atoms included. The same structure was obtained at room temperature after pretreatment of FMOF-1 to remove any solvent or gas molecules in the channels by heating the crystals at 100° C. in vacuum.

Figure 5:
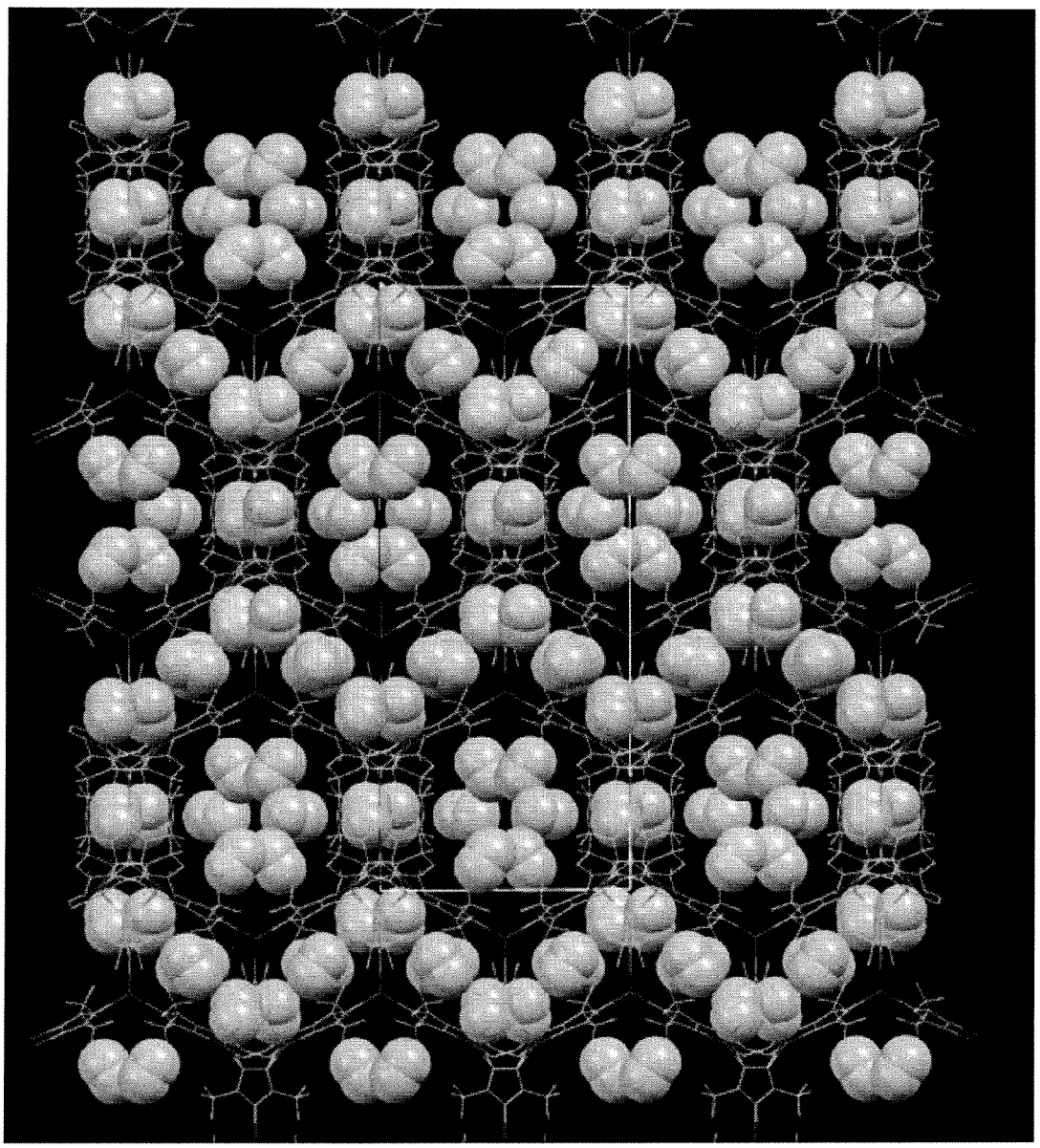
FIG. 5 shows a packing diagram for one embodiment, FMOF-1.$N_2$ crystals, at 100K, with the adsorbed $N_2$ molecules shown by a space-filling representation.

In addition, the structure of a pretreated single crystal of FMOF-1 was studied at 100 K. FIG. 5 shows a packing diagram for FMOF-1.$N_2$ crystals at 100 K. The adsorbed $N_2$ molecules are shown by a space-filling representation. The resulting structure shows nitrogen molecules adsorbed in the open channels even though the only source of $N_2$ was the liquid nitrogen from the cryostream used for cooling the exposed crystal on the diffractometer (i.e., there was no high pressure of $N_2$ applied to a sealed sample). The adsorption of $N_2$ gas also appeared to occur not only in the large open channels but also in the small cavities. The structure shows 5.67 $N_2$ molecules per repeat unit.

Figure 6:
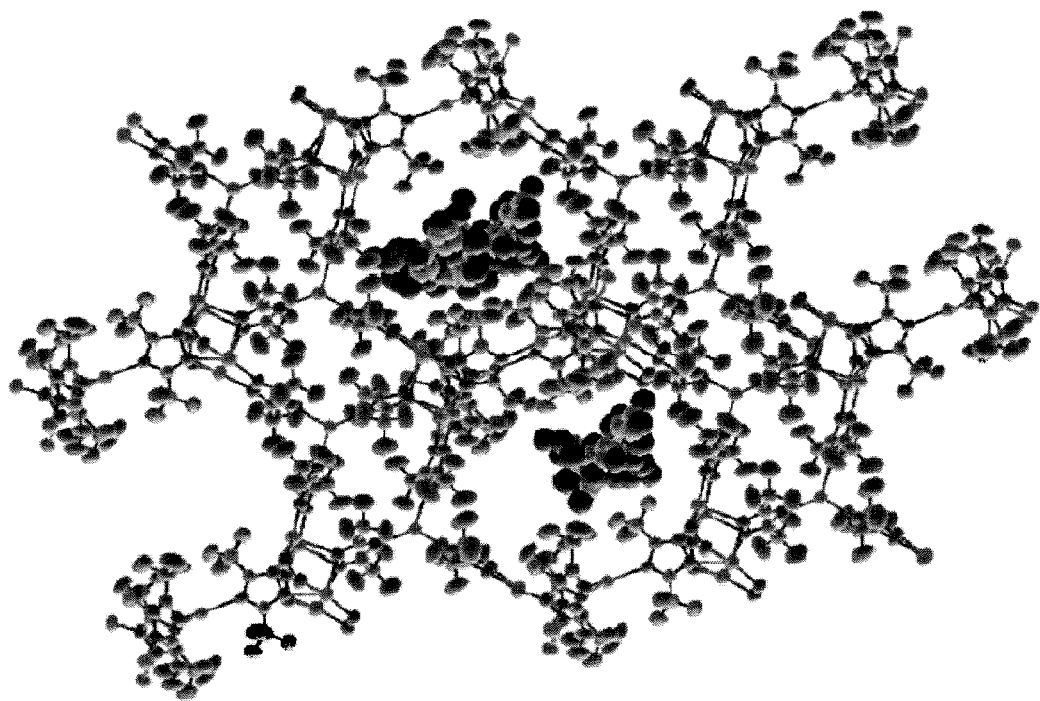
FIG. 6 shows a packing diagram for crystals of one embodiment, FMOF-1.toluene, at 100 K, with the adsorbed toluene molecules shown by a space-filling representation.

FIG. 6 shows a packing diagram for FMOF-1.toluene crystals at 100 K. The adsorbed toluene molecules are shown by a space-filling representation. As seen in FIG. 6, crystals of FMOF-1 grown from toluene show a structure in which toluene molecules are adsorbed in the large open channels.

Figure 7:
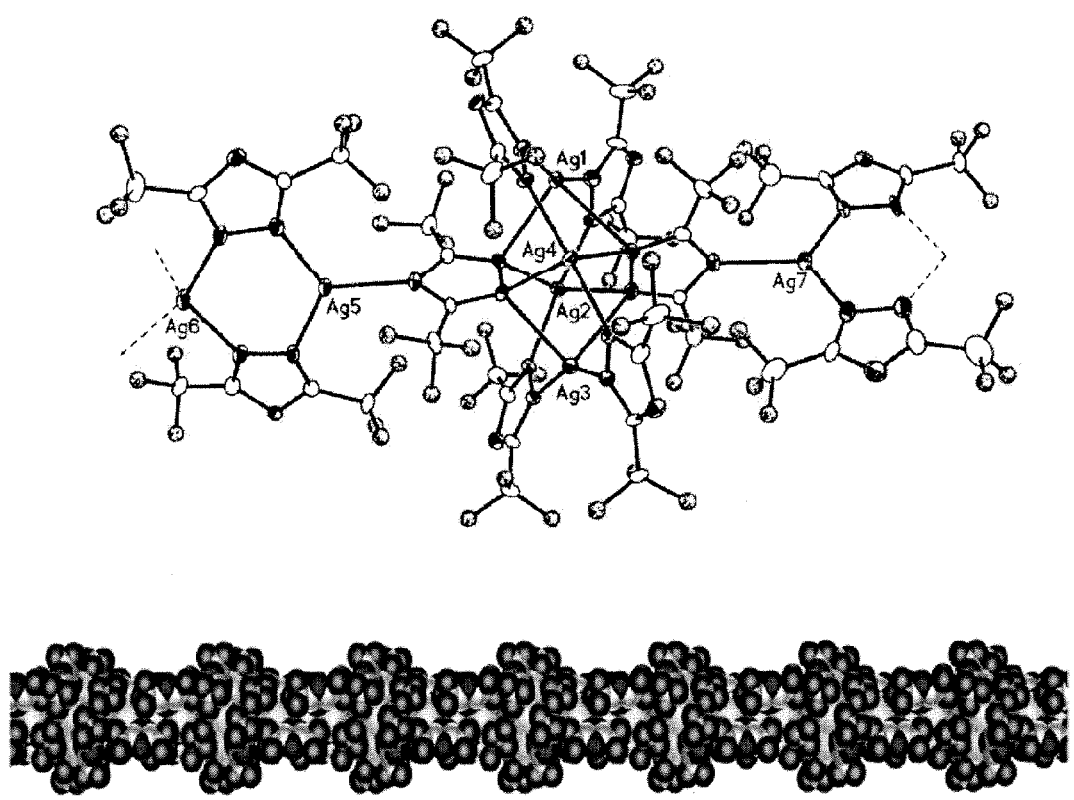
FIG. 7 shows a space-filling representation of one embodiment, FMOF-2, at 100 K.
Figure 8:
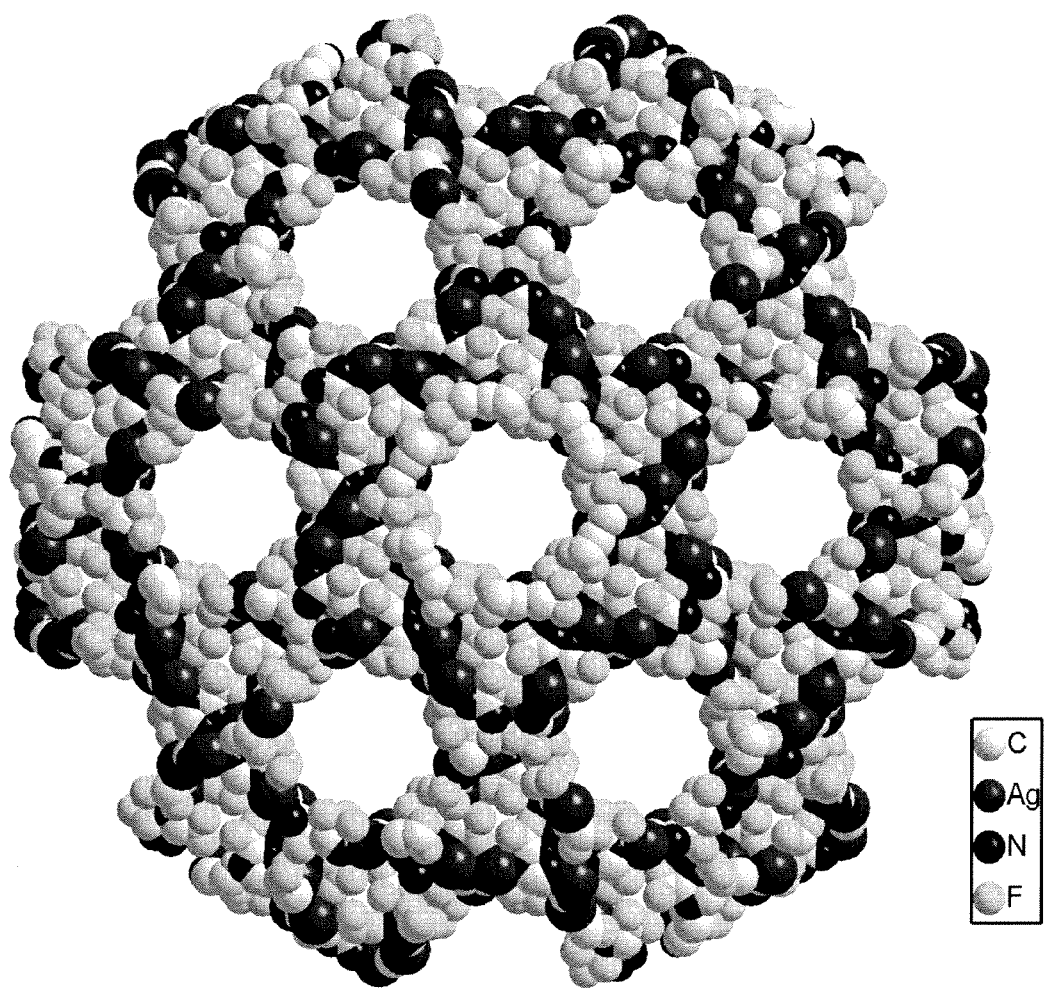
FIG. 8 shows a close-up view of a packing diagram of the solvent-containing structure of one embodiment, FMOF-2, at 100 K.

A further preferred embodiment of the present invention is referred to as FMOF-2. The FMOF-2 framework is a polymorphic form of the FMOF-1 framework with the same chemical composition of the metal and ligand but with a different packing arrangement of the 3-D supramolecular structure. FIG. 7 shows a space-filling representation of the FMOF-2 framework at 100 K while FIG. 8 shows a close-up view of the packing diagram for the solvent-containing structure at 100 K, which contains both open channels and cavities. The toluene molecules are lined in a well-organized facial arrangement with respect to the fluorinated walls of both the large channels and smaller cavities, underscoring the superacidity of these fluoro-lined channels and cavities.

Figure 9:
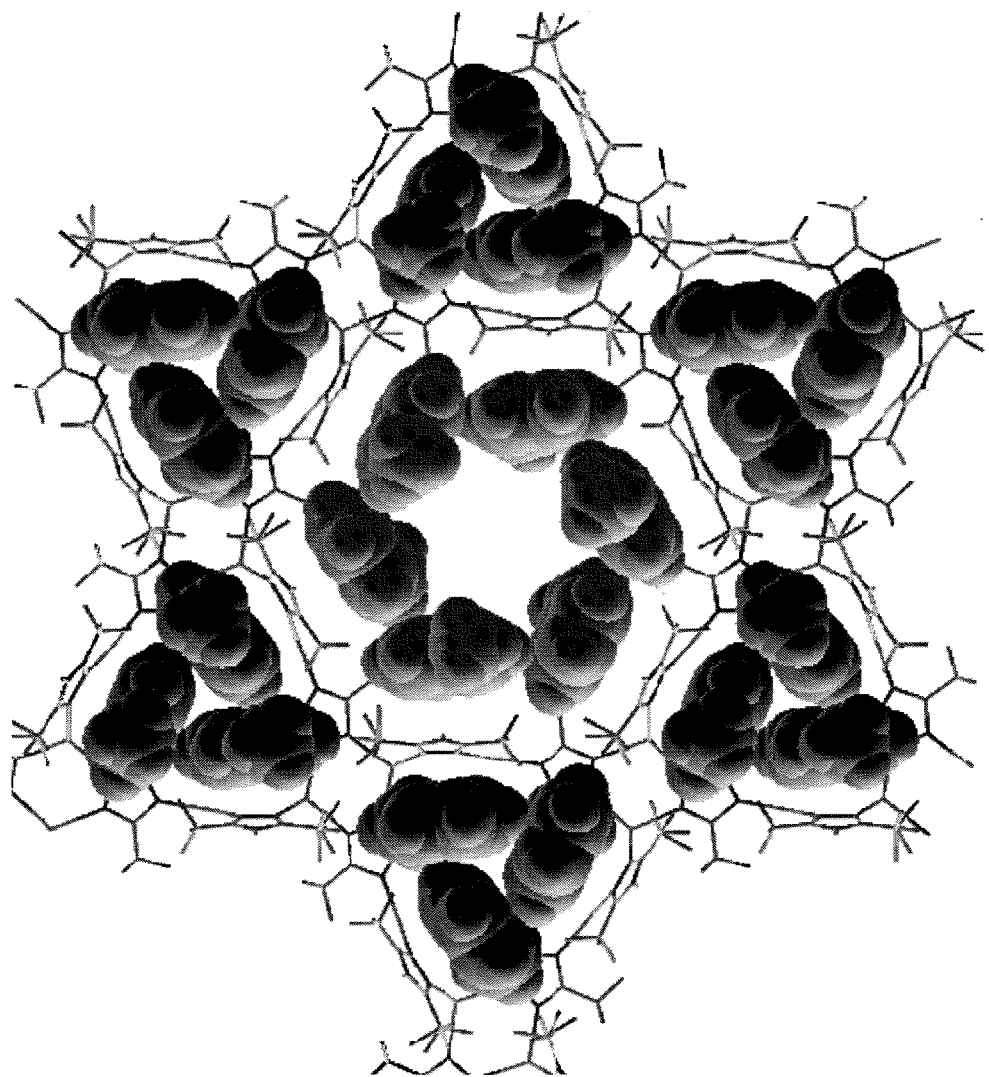
FIG. 9 shows a packing diagram for crystals of one embodiment, FMOF-3, at 100 K.

An additional preferred embodiment of the present invention is referred to as FMOF-3. The FMOF-3 framework is a polymorphic form of FMOF-1 and FMOF-2 frameworks but with a 2-D instead of 3-D supramolecular structure. FIG. 9 shows the packing diagram for FMOF-3 crystals at 100 K.

Figure 10:
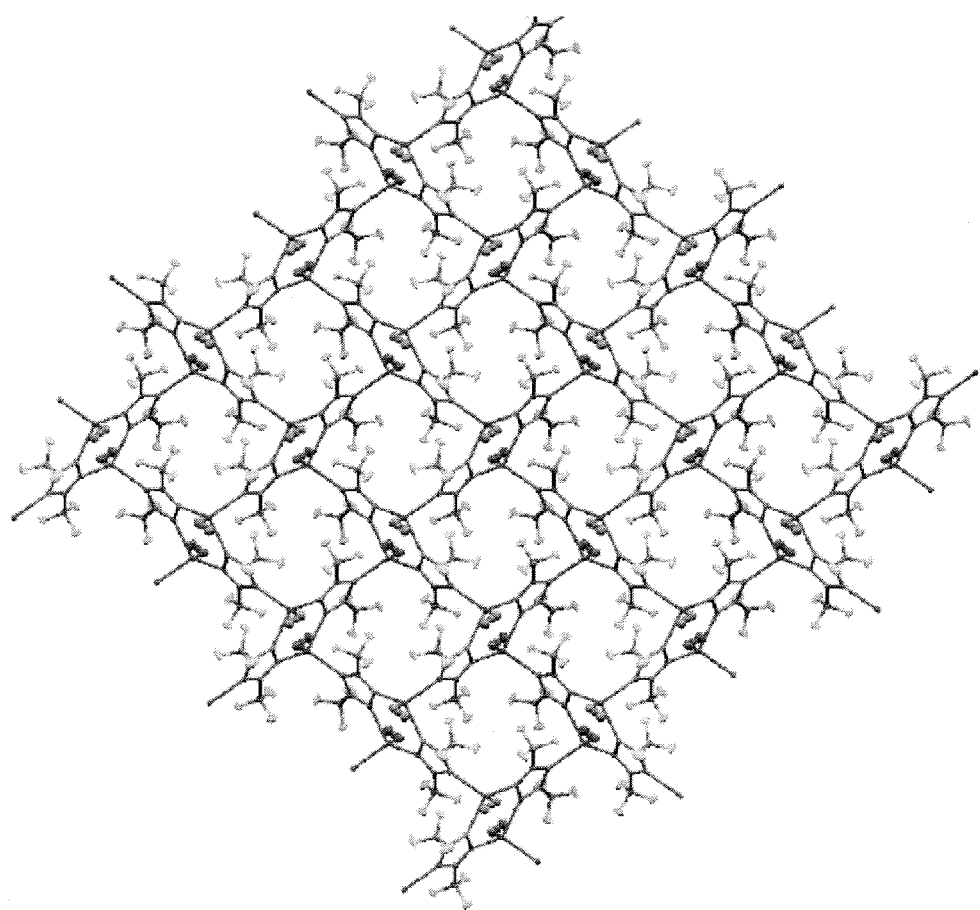
FIG. 10 shows a packing diagram for crystals of one embodiment, FMOF-4, at 100 K.

An additional preferred embodiment of the present invention is referred to as FMOF-4. The FMOF-4 framework is a polymorphic form of FMOF-1, FMOF-2, and FMOF-3. FIG. 10 shows the packing diagram for FMOF-4 crystals at 100K. The structure of FMOF-4 is similar to FMOF-1 and FMOF-2 in that it is a 3-D framework while it is similar to FMOF-3 in that it contains only small cavities as opposed to large channels. Despite the latter, both FMOF-3 and FMOF-4 are useful for gas adsorption because, as shown in FIG. 5, gas molecules can indeed adsorb in small cavities.

The FMOFs exhibit many common properties, including solubility in many organic solvents, high thermal-, air-, and light-stability. The stability is likely imparted by the fluorous protection because of the known strength of the C—F bonds that line the channels and cavities as shown above for preferred fluorous embodiments. All FMOF materials can be considered as coated frameworks where the fluorous protection is an inherent part of the structure as opposed to being due to adding an external material. Another noteworthy property for FMOF materials is their high density (in the 1.6-2.2 g/mL range for select embodiments). This is extremely important for gas storage applications because it endows high volumetric capacity.

The FMOF materials contain open channels or cavities which can accommodate gas molecules at relatively high pressure and/or low temperatures to maximize their storage capacity. The gas molecules can then be released by decreasing the pressure and/or increasing the temperatures. The adsorption/desorption processes are usually reversible and can be fully controlled by pressure, temperature, or both. The quantity of $H_2$ will be very similar in adsorption and desorption points at similar pressures due to the reversibility of the process.

The FMOF materials of the current invention are not limited to the Ag(I)-triazolate embodiments shown above. Other porous Ag(I)-triazolates, as well as other metal-ligand combinations, are possible. Other metal components within the framework material can be used according to the present invention, including metal atoms of the main group, transition metal series, and lanthanide series of the periodic system of the elements. Among those metal components, particular examples include $Li^+$, $Na^+$, $K^+$, $Rb^+$, $Be^{2+}$, $Mg^{2+}$, $Ca^{2+}$, $Sr^{2+}$, $Ba^{2+}$, $Sc^{2+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Pd^{2+}$, $Pd^0$, $Pt^{2+}$, $Pt^0$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$, and combinations thereof.

The ligands used for construction of the fluorinated MOFs are also not limited to fluorinated triazolates. Besides triazolates, any ligands with two or more donor atoms and two or more fluorine atoms can be used as bridging ligands for construction of fluorinated MOFs. With regard to construction of FMOFs, several other fluorinated organic ligands, such as fluorinated carboxylates, fluorinated polypyridines, fluorinated phosphines, fluorinated thiolates, and others, for coordination to various soft and hard metal centers, can also be used.

Potential applications of the current FMOFs are wide-ranging and not limited to $H_2$ or hydrocarbon storage. Other examples include storage or transport of other gases, such as $CH_4$, $O_2$, $N_2$, CO, $CO_2$, $NO_N$, and vapors of hazardous organic solvents. These materials include fuel, greenhouse gases, and vapors of environmental pollutants and health hazards. The superior acidity and other structural factors discussed above regarding $H_2$ storage are also valid for these applications. Another example is gas separation, which is facilitated by the anticipated high selectivity of our fluorous materials. The affinity of the FMOF materials to these aromatic molecules is clearly illustrated by the toluene structures already discussed, particularly FIG. 9 for FMOF-2. An additional example is use in catalysis. The superior acidity, stability, open structures, and solubility of the FMOF materials are excellent features for use in multiple heterogeneous and homogeneous catalytic processes.

The present disclosure demonstrates super-high hydrophobic FMOFs exhibiting remarkable air and water stability and high capacity with high affinity to $C_6$-$C_8$ hydrocarbons of oil components. These FMOFs can selectively adsorb $C_6$-$C_8$ hydrocarbons in preference to water, through a combination of hydrophobicity and capillary action. Results suggest that the FMOFs represent a promising class of porous materials that should find practical applications in the removal of organics, particularly in the field of oil spill cleanup and hydrocarbon storage. While available FMOFs are stable when exposed to water and air, and can be readily recycled many times, the practicality of their use and mass production considerations will increase upon expansion to include abundant metals such as Cu and Zn instead of Ag.

Example 1

Water Stability Analysis

Figure 11:
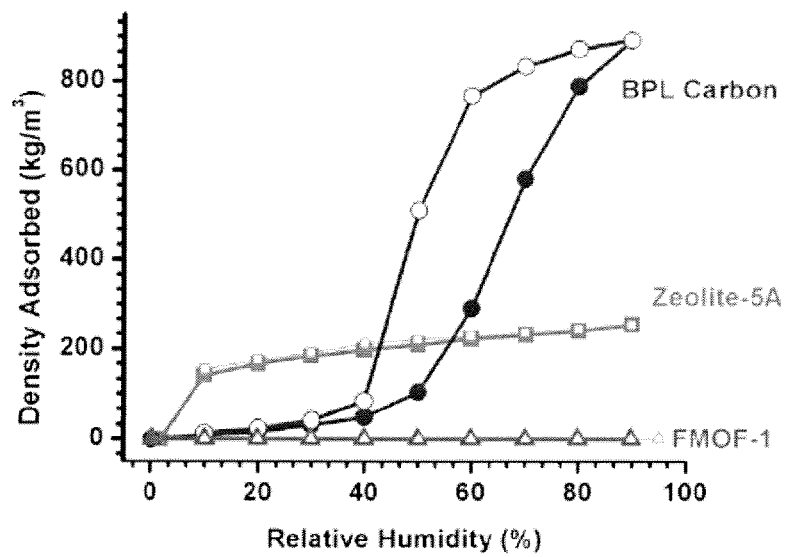
FIG. 11 shows (a) water adsorption isotherms for FMOF-1, zeolite-5 Å, and BPL carbon, and (b) oil components adsorption in FMOF-1 using vapors of cyclohexane, n-hexane, benzene and toluene. Open symbols indicate desorption.
Figure 11:
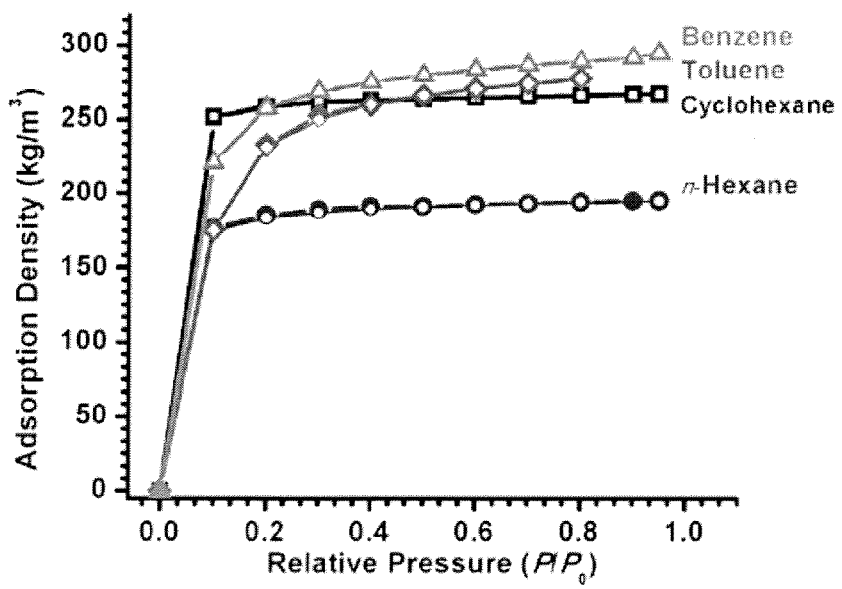

Water adsorption isotherms reveal that FMOF-1 is superhydrophobic and significantly superior to BPL carbon and zeolite-5A (FIG. 11(*a*)). The water stability of FMOF-1 was examined by water adsorption isotherms (FIG. 11) and by single crystal X-ray diffraction.

Adsorption and desorption isotherms were obtained via TA Instruments Q5000 SA and VTI-SA high sensitivity thermogravimetric dynamic vapor sorption analyzer which enables sorption analysis of dry powder samples of FMOF-1 under controlled temperature and relative humidity/pressure. The balance has a signal resolution of 0.01 μg, and a sensitivity of 0.1 μg. These isotherms were measured at 25° C. by monitoring the weight change of the sample as a function of relative humidity of water or relative pressure of solvents for a known weight of FMOF-1 (~10 mg). Relative humidity levels were stepped up from 0% to 98% with an increment of 10% each step then step down to 0%. Real time weight, temperature, relative humidity/pressure were recorded. When weight change less than 0.01% for 10 min was observed, the test automatically moved to the next step of RP or RH.

Zeolite-5A is hydrophilic, which adsorbs water at very low $P/P_0$ (<0.1). BPL carbon is highly hydrophobic, whose water adsorption isotherm shows no uptake up to $P/P_0$=0.4 followed by a steep rise and the attainment of saturation capacity exceeding 800 kg/m$^3$ at $P/P_0$=0.8 with a hysteresis loop (type V). In contrast, FMOF-1 shows negligible water adsorption even at $P/P_0$ up to 0.9 (FIG. 11(*a*)). These results indicate that the large channels (1.2×0.8 nm) in FMOF-1 are "closed" to water, rendering a superhydrophobic behavior. According to the water adsorption behavior, porous materials can be classified as hydrophilic, hydrophobic, or superhydrophobic with adsorption of water at low $P/P_0$<0.1, moderate $P/P_0$>0.3, or no detectable adsorption at all (even near 100% relative humidity), respectively. Few water adsorption isotherms in MOF materials are available, perhaps due to reactivity or lack of stability of common MOFs, such as MOF-5 and HKUST-1, upon water exposure. FMOF-1 represents the first example of a superhydrophobic 3-D porous crystal with a uniform micropore size that is "closed" to water; indeed, even immersing FMOF-1 crystals in water for multiple weeks did not compromise the stability, porosity or crystallinity. The water adsorption behavior of FMOF-1 and its superhydrophobic pore surfaces suggest very weak guest-host interactions between FMOF-1 walls and water as a consequence of the presence of fluorine lining in the channel walls.

Figure 12:
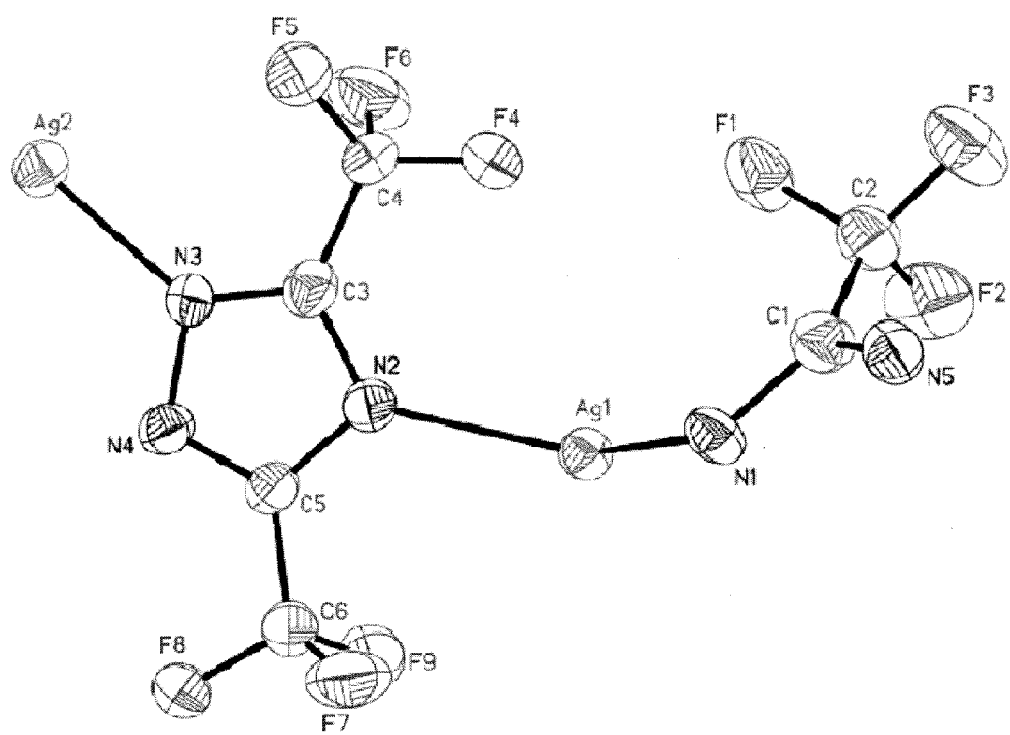
FIG. 12 shows ORTEP (50%) plot of the asymmetric unit in the water-soaked FMOF-1.
Figure 13:
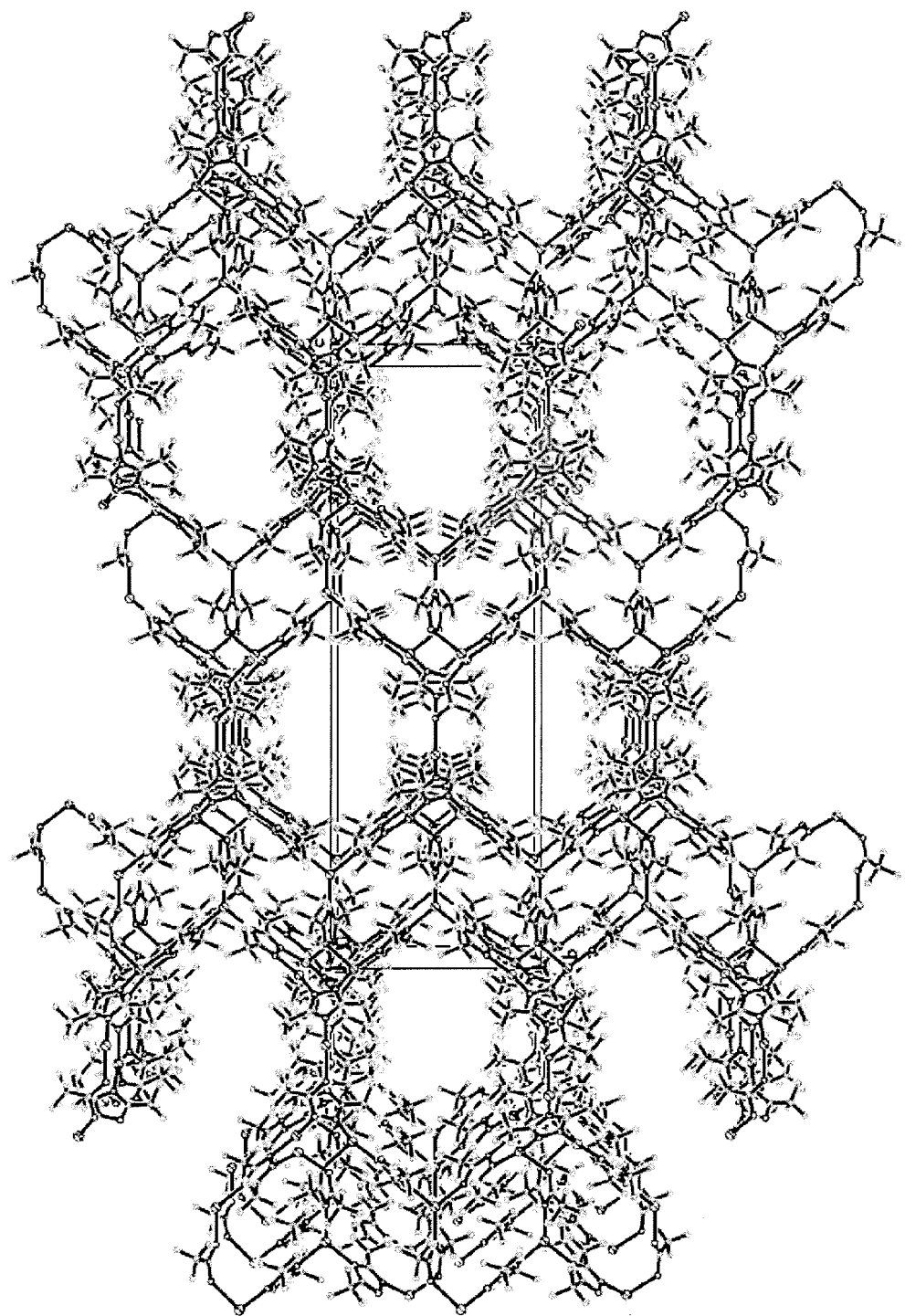
FIG. 13 shows crystal packing of the water-soaked FMOF-1 showing that no water molecule included in the channel and cage of FMOF-1.

Single crystal X-ray diffraction was carried out using a water soaked single crystal of FMOF-1. The evacuated single crystal of FMOF-1 was soaked in distilled water for several days before collect data on a Bruker SMATR APEX2 CCD-based X-ray diffractometer. The XRD pattern of water soaked FMOF-1 is identical to that of the water untreated sample, indicating the crystal structure of FMOF-1 hold after water-treatment and no water molecules included in the channel or cage of FMOF-1 (FIG. 12-13, Table 1-3 below). The IR spectra were collected using a Nicolet 6700 FT-IR spectrometer equipped with a KBr beamsplitter. The Micro Well Plate accessory has an embedded DIGS detector, for data collection via transmission. The sample plate itself was made from a rectangle of silicon subdivided into cells by a PTFE mask.

Figure 14:
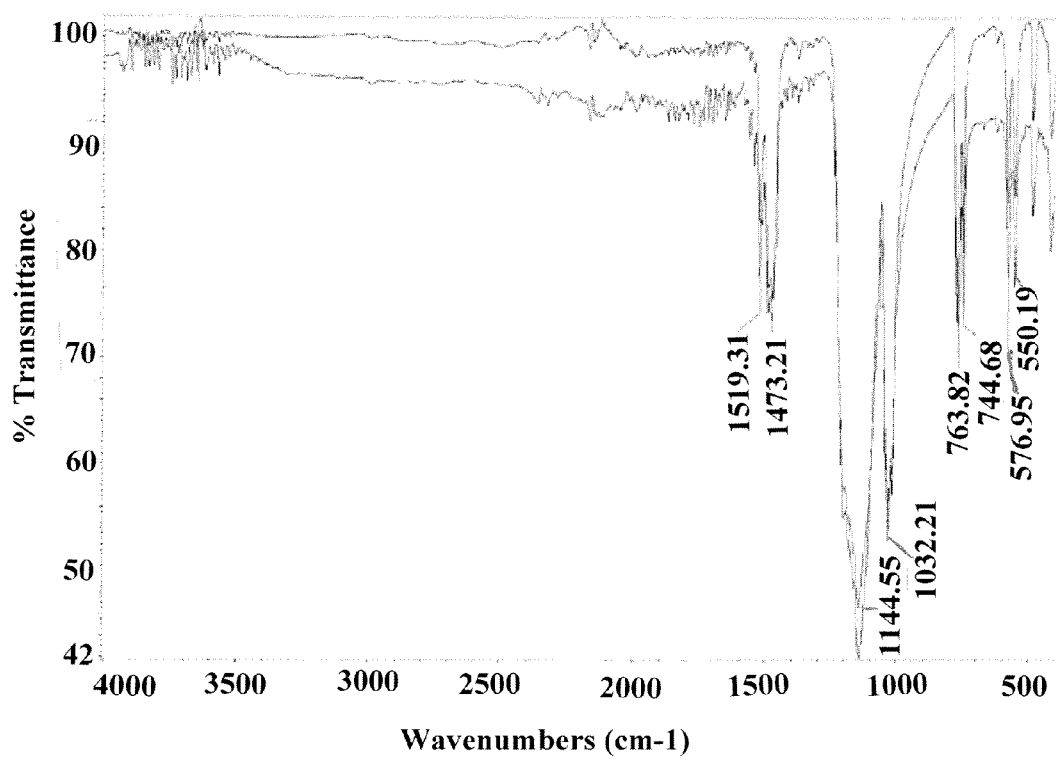
FIG. 14 shows IR plots of the water treated FMOF-1 (red line).

The experiment setup and data collection were driven by the Array Automation add-in to the OMNIC spectroscopy software. Processing via a discriminant analysis using TQ Analyst within Array Automation allowed the differences in the spectra to be brought out consistently. The FT-IR spectrum was obtained over a frequency between 350 and 4000 cm$^{-1}$. The spectra (FIG. 14) were collected using 128 scans at 4 cm$^{-1}$ resolution. The purple line shows IR trace of the evacuated sample. Water treatment condition: the evacuated crystal of FMOF-1 was soaked in distilled water for several days before it was carefully sliced off the outside shell for IR data collection. As shown in FIG. 14, no O—H stretching was observed for water treated FMOF-1 sample above 3200 cm$^{-1}$.

TABLE 1

Crystal data and structure refinement for water-soaked FMOF-1.

| | |
|---|---|
| Identification code | water-soaked FMOF-1 |
| Empirical formula | C48 Ag12 F72 N36 |
| Formula weight | 3743.28 |
| Temperature | 100(2) K |
| Wavelength | 0.71073 Å |
| Crystal system | Tetragonal |
| Space group | I –42 d |
| Unit cell dimensions | a = 13.300(2) Å   □ = 90°. |
| | b = 13.300(2) Å   □ = 90°. |
| | c = 39.569(7) Å   □ = 90°. |
| Volume | 6999(2) Å$^3$ |
| Z | 2 |
| Density (calculated) | 1.776 Mg/m$^3$ |
| Absorption coefficient | 1.774 mm$^{-1}$ |
| F(000) | 3504 |
| Crystal size | 0.40 × 0.31 × 0.21 mm$^3$ |
| Theta range for data collection | 2.06 to 27.21°. |
| Index ranges | –17 <= h <= 17, –17 <= k <= 17, –50 <= l <= 50 |
| Reflections collected | 40375 |
| Independent reflections | 3896 [R(int) = 0.0566] |
| Completeness to theta = 27.21° | 99.5% |
| Absorption correction | Semi-empirical from equivalents |
| Max. and min. transmission | 0.7048 and 0.5401 |
| Refinement method | Full-matrix least-squares on F$^2$ |
| Data/restraints/parameters | 3896/1/191 |
| Goodness-of-fit on F$^2$ | 1.006 |
| Final R indices [I > 2sigma(I)] | R1 = 0.0324, wR2 = 0.0914 |
| R indices (all data) | R1 = 0.0397, wR2 = 0.0976 |
| Absolute structure parameter | –0.01(4) |
| Largest diff. peak and hole | 0.653 and –0.539 e · Å$^{-3}$ |

TABLE 2

Atomic coordinates (×10$^4$) and equivalent isotropic displacement parameters (Å$^2$ × 10$^3$) for water-soaked FMOF-1.

| | x | y | z | U(eq) |
|---|---|---|---|---|
| Ag(1) | 5000 | 10000 | 9014(1) | 48(1) |
| Ag(2) | 1180(1) | 8596(1) | 9948(1) | 59(1) |
| F(1) | 5181(4) | 7875(3) | 8593(1) | 90(1) |
| F(2) | 6644(4) | 8424(4) | 8480(1) | 105(2) |
| F(3) | 5842(4) | 7671(3) | 8102(1) | 100(2) |
| F(4) | 3759(3) | 8030(3) | 9086(1) | 86(1) |
| F(5) | 2193(3) | 7859(4) | 9193(2) | 114(2) |
| F(6) | 3270(5) | 7439(3) | 9541(1) | 120(2) |
| F(7) | 3913(5) | 12048(3) | 9291(1) | 119(2) |
| F(8) | 3259(3) | 12308(3) | 9775(1) | 98(1) |
| F(9) | 4703(3) | 11656(4) | 9723(2) | 127(2) |
| N(1) | 5000 | 10000 | 8452(2) | 51(1) |
| N(2) | 3671(3) | 9938(4) | 9377(1) | 54(1) |
| N(3) | 2385(3) | 9398(3) | 9687(1) | 53(1) |
| N(4) | 2566(4) | 10374(3) | 9773(1) | 58(1) |
| N(5) | 5178(3) | 9508(3) | 7919(1) | 53(1) |
| C(1) | 5289(4) | 9278(4) | 8242(1) | 58(1) |
| C(2) | 5730(5) | 8301(5) | 8351(2) | 66(2) |
| C(3) | 3057(4) | 9172(5) | 9456(2) | 58(1) |

TABLE 2-continued

Atomic coordinates (×10$^4$) and equivalent isotropic displacement parameters (Å$^2$ × 10$^3$) for water-soaked FMOF-1.

| | x | y | z | U(eq) |
|---|---|---|---|---|
| C(4) | 3074(5) | 8140(5) | 9303(2) | 79(2) |
| C(5) | 3324(4) | 10662(4) | 9582(1) | 55(1) |
| C(6) | 3774(5) | 11673(5) | 9593(2) | 79(2) |

U(eq) is defined as one third of the trace of the orthogonalized U$^{ij}$ tensor.

TABLE 3

Bond lengths [Å] and angles [°] for water-soaked FMOF-1.

| | |
|---|---|
| Ag(1)—N(1) | 2.224(6) |
| Ag(1)—N(2) | 2.279(4) |
| Ag(1)—N(2)#1 | 2.279(4) |
| Ag(2)—N(4)#2 | 2.181(5) |
| Ag(2)—N(3) | 2.184(4) |
| Ag(2)—N(5)#3 | 2.616(4) |
| F(1)—C(2) | 1.329(8) |
| F(2)—C(2) | 1.328(8) |
| F(3)—C(2) | 1.303(7) |
| F(4)—C(4) | 1.259(8) |
| F(5)—C(4) | 1.305(8) |
| F(6)—C(4) | 1.352(10) |
| F(7)—C(6) | 1.307(9) |
| F(8)—C(6) | 1.306(7) |
| F(9)—C(6) | 1.340(9) |
| N(1)—C(1) | 1.328(7) |
| N(1)—C(1)#1 | 1.328(7) |
| N(2)—C(5) | 1.342(7) |
| N(2)—C(3) | 1.342(7) |
| N(3)—C(3) | 1.315(7) |
| N(3)—N(4) | 1.363(6) |
| N(4)—C(5) | 1.316(7) |
| N(4)—Ag(2)#4 | 2.181(5) |
| N(5)—C(1) | 1.321(7) |
| N(5)—N(5)#1 | 1.392(9) |
| N(5)—Ag(2)#3 | 2.616(4) |
| C(1)—C(2) | 1.490(8) |
| C(3)—C(4) | 1.499(9) |
| C(5)—C(6) | 1.473(8) |
| N(1)—Ag(1)—N(2) | 129.06(10) |
| N(1)—Ag(1)—N(2)#1 | 129.06(10) |
| N(2)—Ag(1)—N(2)#1 | 101.9(2) |
| N(4)#2—Ag(2)—N(3) | 160.99(16) |
| N(4)#2—Ag(2)—N(5)#3 | 105.69(16) |
| N(3)—Ag(2)—N(5)#3 | 91.08(15) |
| C(1)—N(1)—C(1)#1 | 102.4(6) |
| C(1)—N(1)—Ag(1) | 128.8(3) |
| C(1)#1—N(1)—Ag(1) | 128.8(3) |
| C(5)—N(2)—C(3) | 101.2(4) |
| C(5)—N(2)—Ag(1) | 128.5(4) |
| C(3)—N(2)—Ag(1) | 130.2(4) |
| C(3)—N(3)—N(4) | 105.7(4) |
| C(3)—N(3)—Ag(2) | 135.8(4) |
| N(4)—N(3)—Ag(2) | 118.5(3) |
| C(5)—N(4)—N(3) | 105.6(4) |
| C(5)—N(4)—Ag(2)#4 | 133.6(4) |
| N(3)—N(4)—Ag(2)#4 | 118.0(3) |
| C(1)—N(5)—N(5)#1 | 104.8(3) |
| C(1)—N(5)—Ag(2)#3 | 120.4(4) |
| N(5)#1—N(5)—Ag(2)#3 | 101.6(3) |
| N(5)—C(1)—N(1) | 113.9(5) |
| N(5)—C(1)—C(2) | 121.8(5) |
| N(1)—C(1)—C(2) | 124.2(5) |
| F(3)—C(2)—F(2) | 105.3(6) |
| F(3)—C(2)—F(1) | 109.5(6) |
| F(2)—C(2)—F(1) | 106.3(6) |
| F(3)—C(2)—C(1) | 112.7(5) |
| F(2)—C(2)—C(1) | 111.4(6) |
| F(1)—C(2)—C(1) | 111.4(5) |
| N(3)—C(3)—N(2) | 113.7(5) |
| N(3)—C(3)—C(4) | 120.1(5) |
| N(2)—C(3)—C(4) | 126.3(5) |
| F(4)—C(4)—F(5) | 113.0(7) |

TABLE 3-continued

Bond lengths [Å] and angles [°] for water-soaked FMOF-1.

| | |
|---|---|
| F(4)—C(4)—F(6) | 104.8(6) |
| F(5)—C(4)—F(6) | 102.0(6) |
| F(4)—C(4)—C(3) | 113.1(5) |
| F(5)—C(4)—C(3) | 112.5(6) |
| F(6)—C(4)—C(3) | 110.7(6) |
| N(4)—C(5)—N(2) | 113.7(5) |
| N(4)—C(5)—C(6) | 124.2(5) |
| N(2)—C(5)—C(6) | 122.1(5) |
| F(8)—C(6)—F(7) | 109.4(7) |
| F(8)—C(6)—F(9) | 106.3(6) |
| F(7)—C(6)—F(9) | 103.2(6) |
| F(8)—C(6)—C(5) | 113.1(5) |
| F(7)—C(6)—C(5) | 112.4(6) |
| F(9)—C(6)—C(5) | 111.8(6) |

Symmetry transformations used to generate equivalent atoms:
1 −x + 1, −y + 2, z
2 y − 1, −x + 1, −z + 2
3 −x + 1/2, y, −z + 7/4
4 −y + 1, x + 1, −z + 2

Example 2

Hydrocarbon Adsorption

Adsorption and desorption isotherms were obtained via TA Instruments Q5000 SA and VTI-SA high sensitivity thermogravimetric dynamic vapor sorption analyzer which enables sorption analysis of dry powder samples of FMOF-1 under controlled temperature and relative humidity/pressure. The balance has a signal resolution of 0.01 μg, and a sensitivity of 0.1 μg. These isotherms were measured at 25° C. by monitoring the weight change of the sample as a function of relative humidity of water or relative pressure of solvents for a known weight of FMOF-1 (~10 mg). Relative humidity levels were stepped up from 0% to 98% with an increment of 10% each step then step down to 0%. Real time weight, temperature, relative humidity/pressure were recorded. When weight change less than 0.01% for 10 min was observed, the test automatically moved to the next step of RP or RH.

Figure 15:
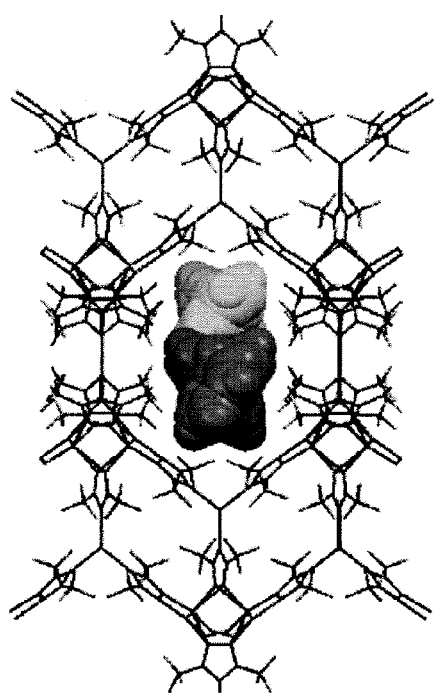
FIG. 15 shows (a) crystal structure of toluene solvate of FMOF-1 showing toluene molecules disordered in two symmetry-related positions in one large channel repeat unit, and (b) packing of toluene guest molecules in interconnected FMOF-1 cavities.
Figure 15:
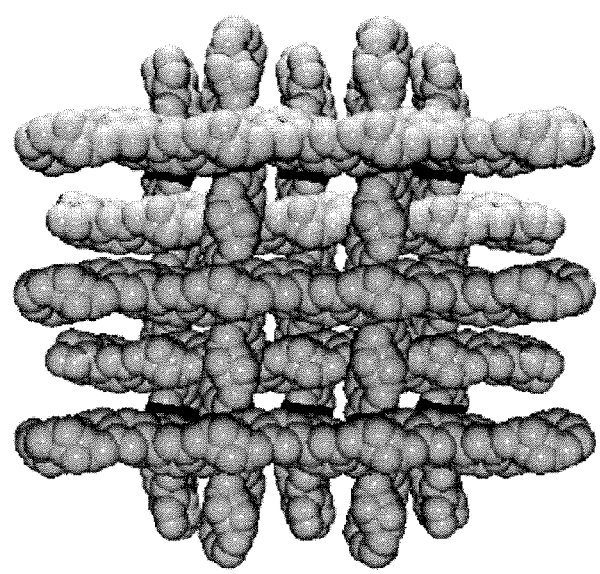

The high porosity of FMOF-1 allows potential access by a variety of organic vapor molecules, particularly the most common oil components embodied by $C_6$-$C_8$ hydrocarbons. The sorption behavior of n-hexane, cyclohexane, benzene, and toluene at 298 K are shown in FIG. 11(b), featuring typical type-I isotherms. At $P/P_0$=0.10, the adsorption of n-hexane and cyclohexane reach saturation, whereas benzene and toluene reach saturation at $P/P_0$=0.20. The strong uptake at low pressure indicates the presence of strong host-guest interactions through confinement effects for aromatic adsorbates. The amounts adsorbed for n-hexane, cyclohexane, benzene and toluene are 175, 300, 250 and 240 kg/m$^3$, respectively. The toluene and benzene capacity of FMOF-1 is close to the best performing MOF known to date (MOF-5), and superior to other MOF materials. The $C_6$-$C_8$ oil components adsorption/desorption isotherms in FMOF-1 are found to be fully reversible, indicating that incoming guests can move freely into and out of the channels. This can be attributed to the smaller dimensions of guest molecules (2.6×6.8, 4.3×4.3, 3.3×6.6 and 4.0×6.6 Å$^2$ for n-hexane, cyclohexane, benzene and toluene, respectively) than the cavity size in FMOF-1 (vide supra; also see FIG. 15 illustrating toluene inclusion).

Example 3

Crystal Structure

Single crystals of FMOF-1.2Toluene and FMOF-2.4Toluene were prepared. Crystal structure determination for both compounds were carried out using a Bruker SMATR APEX2 CCD-based X-ray diffractometer equipped with a low temperature device and Mo-target X-ray tube (wavelength=0.71073 Å). Measurements were taken at 100(2) K. Data collection, indexing, and initial cell refinements were carried out using APEX2, frame integration and final cell refinements were done using SAINT. Absorption corrections were applied using the program SADABS (Bruker AXS Inc., Madison, Wis.). In the FMOF-1, C atoms of the highly disordered toluene molecules were refined isotropically. The rest non-hydrogen atoms in both compounds were refined anisotropically. Hydrogen atoms in the solvent molecules of the compounds were placed in idealized positions and were refined as riding atoms. Structure solution, refinement, graphic and generation of publication materials were performed by using SHELXTL software (Bruker Analytical X-Ray, Madison, Wis.). Refinement details, structural parameters, bond lengths and angles are given in Tables 4-9 below.

For the FMOF-1.2Toluene structure, toluene molecules were found disordered in two positions and refined accordingly with distance constraints. The occupancy factors of the two solvent molecules were close to 0.25 from initial structure refinement. These values were fixed to 0.25 in the final structure refinement to give the formula $Ag_2[Ag_4(Tz)_6]$.2toluene for FMOF-1.2Toluene. In the FMOF-2.4Toluene, toluene molecules were disordered in two positions with occupancy factors close to 0.50 from initial structure parameters and were refined with constrained distances.

Figure 16:
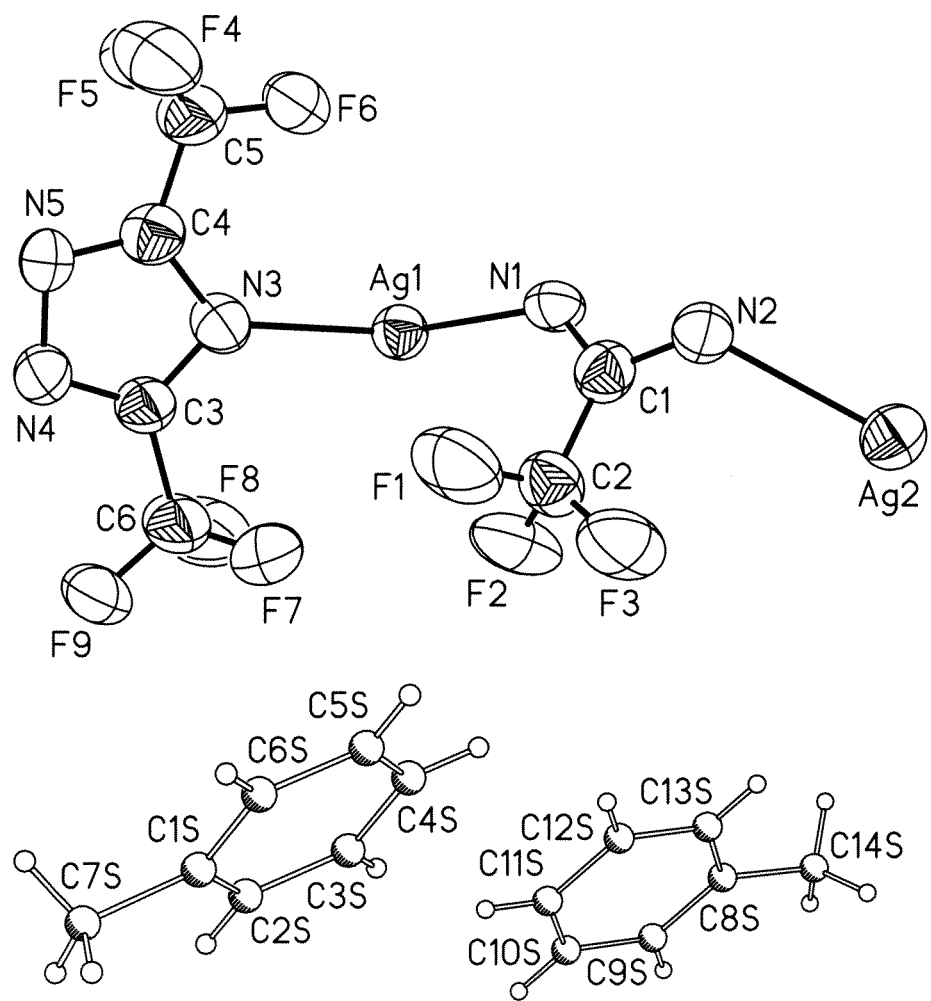
FIG. 16 shows a plot of atoms in the asymmetric unit of $Ag_2[Ag_4(Tz)_6]$.2toluene (FMOF-1.2Toluene).

The toluene adsorption level in FMOF-1 amounts to 8 molecules per unit cell (7478.4(6) Å$^3$ at 298 K) according to FIG. 11(b)'s data, indicative of commensurate adsorption. FIG. 15 shows the isolation of the toluene solvate of FMOF-1, $Ag_2[Ag_4Tz_6]$.2Toluene, whose crystal structure reveals an adsorption limit of 8 molecules per unit cell, or ⅓ toluene solvent molecule per AgTz unit. The toluene content based on the crystal structure is in remarkable agreement with the adsorption isotherm. Toluene molecules are disordered in two symmetric positions (highlighted as yellow and blue sphere in FIG. 15(a)), and adopt a zig-zag packing within FMOF-1 channels (FIG. 15(b)). FIG. 16 shows a plot of atoms in the asymmetric unit of $Ag_2[Ag_4(Tz)_6]$.2Toluene (FMOF-1.2Toluene).

Figure 17:
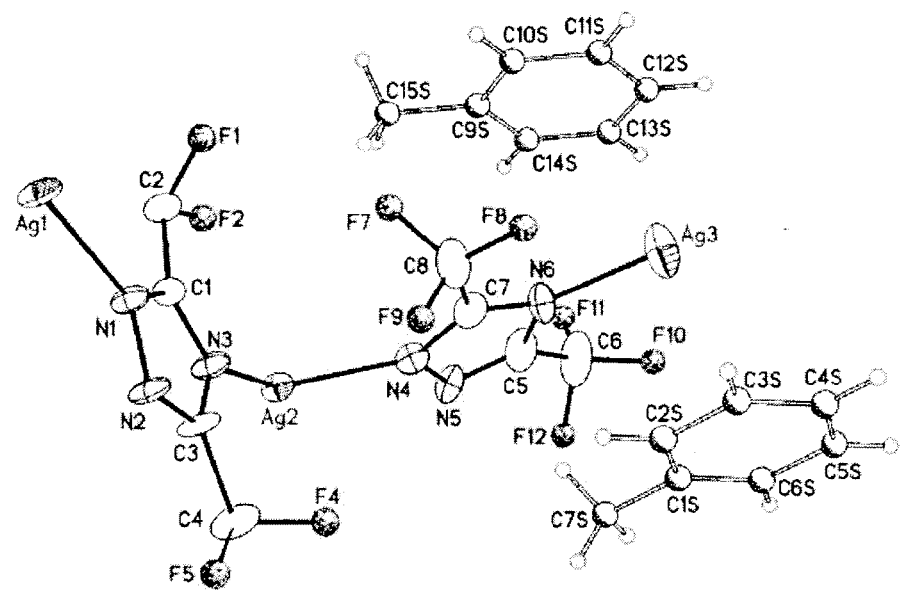
FIG. 17 shows the crystal structure of FMOF-2: (a) asymmetric unit of FMOF-2 showing atomic numbering scheme, and (b) packing of toluene molecules in the small cage and the channel in FMOF-2.
Figure 17:
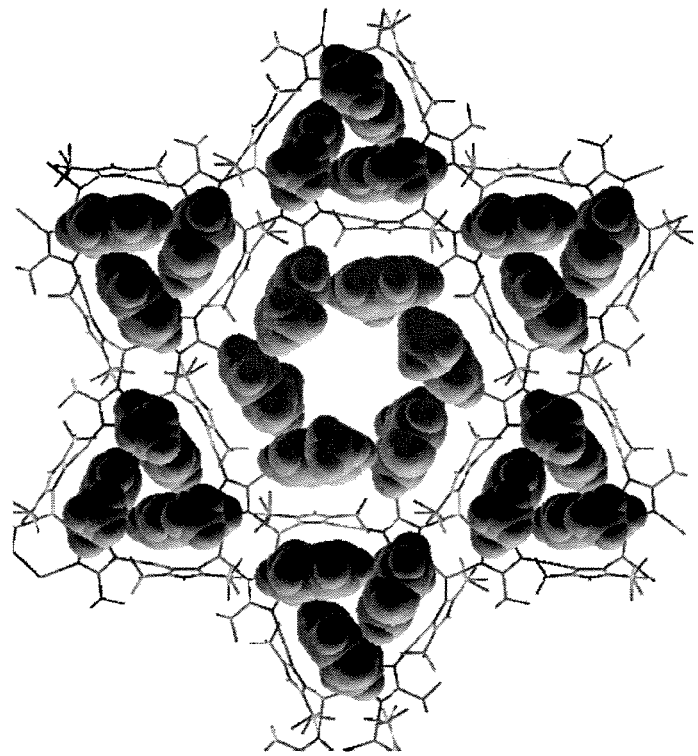

The small cages around the main channels in FMOF-1 are large enough to accommodate gas molecules such as $N_2$, $O_2$ and $H_2$, with one molecule per cage, but are too small to include oil components like toluene and hexanes Enlarging the cage size around the channels, therefore, boosts the oil capacity of such superhydrophobic frameworks. Phase transition via annealing is a good strategy to obtain new thermally stable porous crystals. Such a framework, $[Ag(Ag_3Tz_4)]_{3/2}$.4Toluene (FMOF-2.4Toluene; FIG. 17), has been isolated by annealing FMOF-1 at ca. 300° C. overnight and then re-assembling the framework from toluene/acetonitrile, effectively doubling the toluene solvate contents per AgTz unit. FMOF-2 is one of several crystal polymorphs of FMOF-1 that have been isolated. The structure of FMOF-2 consists of binuclear $[Ag_2Tz_2]$ units (FIG. 17(a)) that are interconnected via sharing the four-coordinate Ag(1) and three-coordinate Ag(2) atoms to form 2D grid sheets (porous layers) parallel to the ab plane. The adjacent $[Ag_2Tz_2]$ units are crystallographically independent and perpendicular to each other, and are parallel and perpendicular to the c-axis, respectively. These layers are then interconnected vertically via two-coordinate Ag(3) atoms (Ag(3)-N(6), 2.118(8) Å) along the c-axis to form a 3-D porous network with two types of voids along the c-axis: microporous hexagonal channels about 1.8 nm in width and triangular-shaped nano-cages with pores about 1.0 nm in diameter surrounding the channels (FIG. 17(b)).

Figure 18:
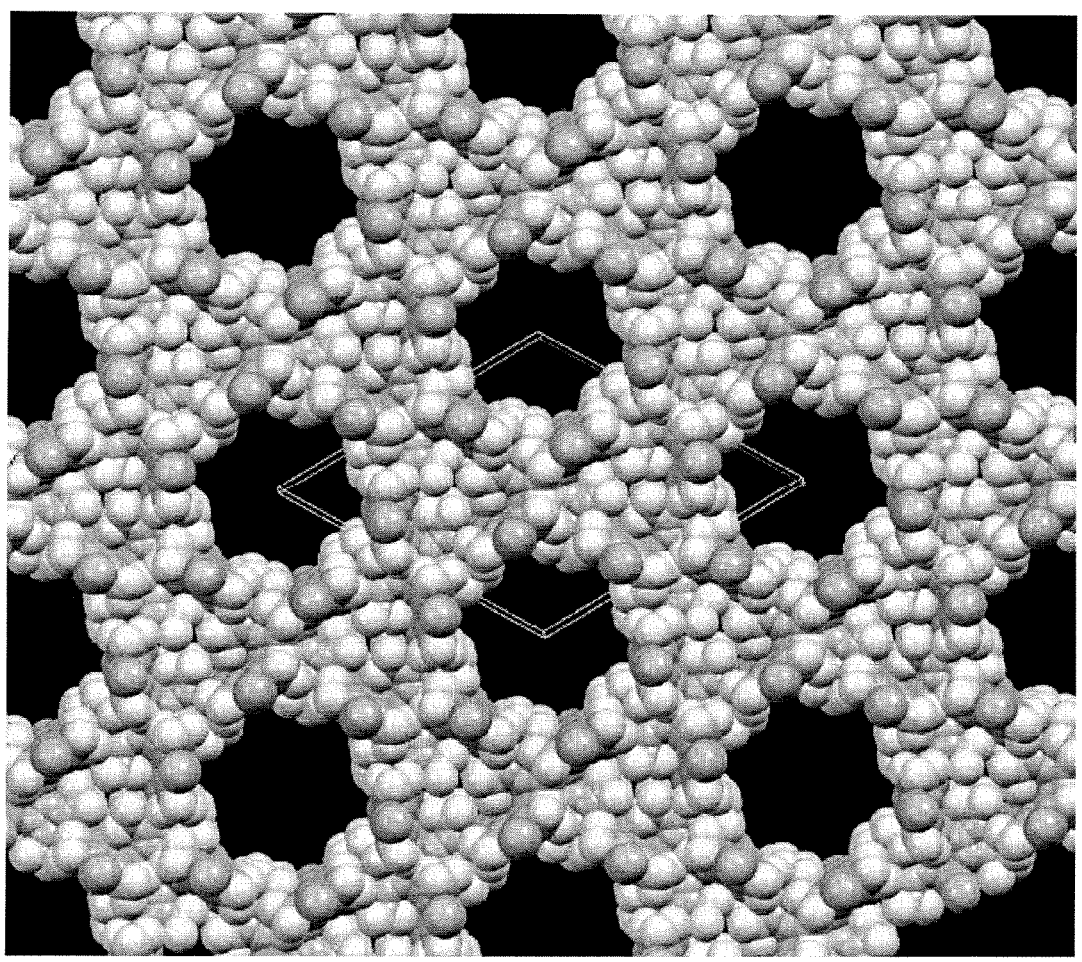
FIG. 18 shows a plot of crystal packing in $[Ag(Ag_3Tz_4)]_{3/2}$.4Toluene (FMOF-2.4Toluene) showing the hexagonal fluorine-lined channel along c-axis.
Figure 19:
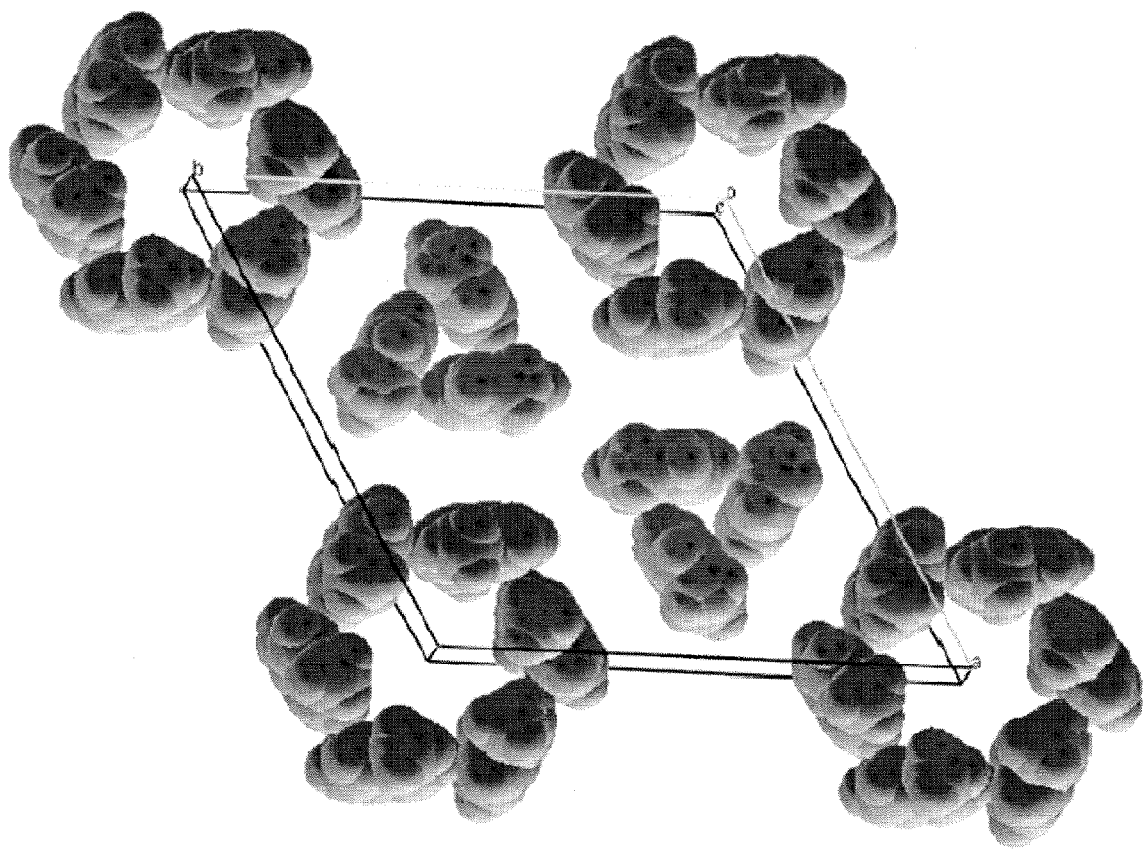
FIG. 19 shows A plot of toluene packing in FMOF-2.4Toluene showing the propeller arrangement of toluene molecules in the cage (pale blue) and in the hexagonal channel (yellow).

The defining features of the cages are their two gate openings exposed to adjacent cages along the c-axis, each consisting of three flexible $CF_3$ groups that provide communication between the cages. Both the large channels and small cages are filled by toluene molecules, with 3 and 6 molecules per cage and channel in each layer, respectively. Toluene molecules whose planes are parallel to the c-axis are arranged as propeller blades around the c-axis to give a $C_3$- and $C_6$-symmetrical propeller structure in the cage and channel, respectively. The capacity of toluene in FMOF-2 is doubled compared to FMOF-1, giving rise to an adsorption limit of 12 toluene molecules per unit cell of 5799.8 $Å^3$. This corresponds to an adsorption density of ~500 $kg/m^3$, which represents the highest adsorption density of an oil component reported for any porous material, including activated carbon, zeolites and MOFs, known to date. FIG. 18 shows a plot of crystal packing in $[Ag(Ag_3Tz_4)]_{3/2}$·4Toluene (FMOF-2·4Toluene) showing the hexagonal fluorine-lined channel along c-axis. FIG. 19 shows a plot of toluene packing in FMOF-2·4Toluene showing the propeller arrangement of toluene molecules in the cage (pale blue) and in the hexagonal channel (yellow).

TABLE 4

Crystal data and structure refinement for FMOF-1·2Toluene.

| | |
|---|---|
| Empirical formula | $C_{38}H_{16}Ag_6F_{36}N_{18}$ |
| Formula weight | 2055.91 |
| Temperature | 100(2) K |
| Wavelength | 0.71073 Å |
| Crystal system | Tetragonal |
| Space group | I –42 d |
| Unit cell dimensions | a = 13.3664(7) Å   α = 90°. |
| | b = 13.3664(7) Å   β = 90°. |
| | c = 39.316(4) Å    γ = 90°. |
| Volume | 7024.3(9) $Å^3$ |
| Z | 4 |
| Density (calculated) | 1.944 $Mg/m^3$ |
| Absorption coefficient | 1.777 $mm^{-1}$ |
| F(000) | 3904 |
| Crystal size | 0.27 × 0.20 × 0.17 $mm^3$ |
| Theta range for data collection | 1.61 to 25.76°. |
| Index ranges | −16 <= h <= 16, −16 <= k <= 16, −48 <= l <= 48 |
| Reflections collected | 37904 |
| Independent reflections | 3381 [R(int) = 0.0453] |
| Completeness to theta = 25.76° | 99.6% |
| Absorption correction | Numerical |
| Max. and min. transmission | 0.7473 and 0.6473 |
| Refinement method | Full-matrix least-squares on $F^2$ |
| Data/restraints/parameters | 3381/14/209 |
| Goodness-of-fit on $F^2$ | 1.097 |
| Final R indices [I > 2sigma(I)] | R1 = 0.0460, wR2 = 0.1261 |
| R indices (all data) | R1 = 0.0621, wR2 = 0.1558 |
| Absolute structure parameter | −0.04(7) |
| Largest diff. peak and hole | 0.914 and −0.423 e · $Å^{-3}$ |

TABLE 5

Atomic coordinates (× $10^4$) and equivalent isotropic displacement parameters ($Å^2$ × $10^3$) for FMOF-1·2Toluene.

| | x | y | z | U(eq) |
|---|---|---|---|---|
| Ag(1) | 10000 | 5000 | 977(1) | 62(1) |
| Ag(2) | 8605(1) | 3828(1) | 2446(1) | 75(1) |
| N(1) | 10000 | 5000 | 1541(2) | 62(2) |
| N(2) | 9516(6) | 5182(6) | 2077(2) | 66(2) |
| N(3) | 10065(6) | 6330(5) | 620(2) | 68(2) |
| N(4) | 9629(6) | 7434(6) | 227(2) | 70(2) |
| N(5) | 10597(6) | 7615(6) | 307(2) | 69(2) |
| C(1) | 9293(7) | 5278(7) | 1757(2) | 69(2) |
| C(2) | 8302(8) | 5729(9) | 1645(3) | 77(3) |
| C(3) | 9361(7) | 6683(7) | 412(3) | 68(2) |
| C(4) | 10823(8) | 6952(7) | 536(3) | 71(2) |
| C(5) | 11841(9) | 6914(9) | 692(4) | 91(3) |
| C(6) | 8330(9) | 6230(9) | 396(3) | 92(3) |
| F(1) | 8426(6) | 6639(7) | 1520(3) | 129(3) |
| F(2) | 7893(5) | 5205(7) | 1402(2) | 112(3) |
| F(3) | 7684(5) | 5849(8) | 1893(2) | 122(3) |
| F(4) | 12125(7) | 7810(5) | 803(3) | 132(3) |
| F(5) | 12542(6) | 6704(9) | 458(2) | 140(3) |
| F(6) | 11951(5) | 6244(6) | 918(2) | 107(2) |
| F(9) | 7706(5) | 6740(6) | 214(2) | 114(3) |
| F(8) | 8369(7) | 5299(6) | 263(3) | 147(3) |
| F(7) | 7966(6) | 6076(9) | 693(2) | 148(4) |
| C(8S) | 5000(30) | −1200(20) | 843(9) | 150 |
| C(9S) | 4410(40) | −1160(30) | 551(10) | 150 |
| C(10S) | 4330(30) | −270(30) | 370(10) | 150 |
| C(11S) | 4830(40) | 580(30) | 481(12) | 150 |
| C(12S) | 5420(40) | 540(30) | 773(13) | 150 |
| C(13S) | 5500(30) | −350(30) | 954(11) | 150 |
| C(14S) | 5060(50) | −2140(30) | 1043(12) | 150 |
| C(1S) | 5140(30) | 7240(20) | 685(8) | 150 |
| C(2S) | 4920(30) | 6250(30) | 604(8) | 150 |
| C(3S) | 5280(30) | 5480(20) | 805(10) | 150 |
| C(4S) | 5870(20) | 5700(20) | 1087(10) | 150 |
| C(5S) | 6090(20) | 6680(20) | 1168(10) | 150 |
| C(6S) | 5730(30) | 7460(20) | 967(10) | 150 |
| C(7S) | 4720(40) | 8070(30) | 475(11) | 150 |

U(eq) is defined as one third of the trace of the orthogonalized $U^{ij}$ tensor.

TABLE 6

Bond lengths [Å] and angles [°] for FMOF-1·2Toluene.

| | |
|---|---|
| Ag(1)—N(1) | 2.215(10) |
| Ag(1)—N(3) | 2.268(7) |
| Ag(1)—N(3)#1 | 2.268(7) |
| Ag(2)—N(5)#2 | 2.181(7) |
| Ag(2)—N(4)#3 | 2.195(8) |
| Ag(2)—N(2) | 2.621(8) |
| N(1)—C(1)#1 | 1.326(11) |
| N(1)—C(1) | 1.326(11) |
| N(2)—C(1) | 1.296(12) |
| N(2)—N(2)#1 | 1.383(15) |
| N(3)—C(3) | 1.331(12) |
| N(3)—C(4) | 1.351(13) |
| N(4)—C(3) | 1.292(12) |
| N(4)—N(5) | 1.352(11) |
| N(4)—Ag(2)#7 | 2.195(8) |
| N(5)—C(4) | 1.300(13) |
| N(5)—Ag(2)#8 | 2.181(7) |
| C(1)—C(2) | 1.521(14) |
| C(2)—F(3) | 1.286(12) |
| C(2)—F(2) | 1.304(13) |
| C(2)—F(1) | 1.323(14) |
| C(3)—C(6) | 1.507(14) |
| C(4)—C(5) | 1.493(15) |
| C(5)—F(6) | 1.270(13) |
| C(5)—F(4) | 1.329(14) |
| C(5)—F(5) | 1.344(16) |
| C(6)—F(7) | 1.282(15) |
| C(6)—F(9) | 1.293(12) |
| C(6)—F(8) | 1.351(15) |
| C(8S)—C(9S) | 1.3900 |
| C(8S)—C(13S) | 1.3900 |
| C(8S)—C(14S) | 1.4900(10) |
| C(9S)—C(10S) | 1.3900 |
| C(10S)—C(11S) | 1.3900 |
| C(11S)—C(12S) | 1.3900 |

TABLE 6-continued

Bond lengths [Å] and angles [°] for FMOF-1•2Toluene.

| | |
|---|---|
| C(12S)—C(13S) | 1.3900 |
| C(1S)—C(2S) | 1.3900 |
| C(1S)—C(6S) | 1.3900 |
| C(1S)—C(7S) | 1.4900(10) |
| C(2S)—C(3S) | 1.3900 |
| C(3S)—C(4S) | 1.3900 |
| C(4S)—C(5S) | 1.3900 |
| C(5S)—C(6S) | 1.3900 |
| N(1)—Ag(1)—N(3) | 128.29(17) |
| N(1)—Ag(1)—N(3)#1 | 128.29(17) |
| N(3)—Ag(1)—N(3)#1 | 103.4(3) |
| N(5)#2—Ag(2)—N(4)#3 | 160.3(3) |
| N(5)#2—Ag(2)—N(2) | 91.9(3) |
| N(4)#3—Ag(2)—N(2) | 105.9(3) |
| N(5)#2—Ag(2)—Ag(2)#4 | 87.2(2) |
| N(4)#3—Ag(2)—Ag(2)#4 | 73.4(2) |
| N(2)—Ag(2)—Ag(2)#4 | 143.30(17) |
| N(5)#2—Ag(2)—N(2)#5 | 157.9(2) |
| N(2)—Ag(2)—N(2)#5 | 79.56(15) |
| Ag(2)#4—Ag(2)—N(2)#5 | 87.68(2) |
| N(5)#2—Ag(2)—Ag(2)#6 | 125.8(2) |
| N(2)—Ag(2)—Ag(2)#6 | 111.54(16) |
| C(1)#1—N(1)—Ag(1) | 130.0(5) |
| C(1)—N(1)—Ag(1) | 130.0(5) |
| C(1)—N(2)—N(2)#1 | 104.5(5) |
| C(1)—N(2)—Ag(2) | 119.9(6) |
| N(2)#1—N(2)—Ag(2) | 101.0(6) |
| C(3)—N(3)—C(4) | 99.4(7) |
| C(3)—N(3)—Ag(1) | 129.1(6) |
| C(4)—N(3)—Ag(1) | 131.4(6) |
| C(3)—N(4)—N(5) | 105.9(8) |
| C(3)—N(4)—Ag(2)#7 | 134.7(7) |
| N(5)—N(4)—Ag(2)#7 | 117.1(6) |
| C(4)—N(5)—N(4) | 105.2(8) |
| C(4)—N(5)—Ag(2)#8 | 135.2(7) |
| N(4)—N(5)—Ag(2)#8 | 119.7(6) |
| N(2)—C(1)—N(1) | 115.5(8) |
| N(2)—C(1)—C(2) | 121.3(8) |
| N(1)—C(1)—C(2) | 123.1(9) |
| F(3)—C(2)—F(2) | 110.6(10) |
| F(3)—C(2)—F(1) | 104.4(10) |
| F(2)—C(2)—F(1) | 105.8(9) |
| F(3)—C(2)—C(1) | 112.9(9) |
| F(2)—C(2)—C(1) | 111.4(9) |
| F(1)—C(2)—C(1) | 111.3(10) |
| N(4)—C(3)—N(3) | 115.1(8) |
| N(4)—C(3)—C(6) | 122.8(9) |
| N(3)—C(3)—C(6) | 122.1(8) |
| N(5)—C(4)—N(3) | 114.4(9) |
| N(5)—C(4)—C(5) | 121.3(9) |
| N(3)—C(4)—C(5) | 124.3(9) |
| F(6)—C(5)—F(4) | 111.8(11) |
| F(6)—C(5)—F(5) | 104.5(11) |
| F(4)—C(5)—F(5) | 102.3(11) |
| F(6)—C(5)—C(4) | 114.6(10) |
| F(4)—C(5)—C(4) | 111.4(10) |
| F(5)—C(5)—C(4) | 111.3(10) |
| F(7)—C(6)—F(9) | 110.2(12) |
| F(7)—C(6)—F(8) | 102.6(11) |
| F(9)—C(6)—F(8) | 107.2(9) |
| F(7)—C(6)—C(3) | 111.9(9) |
| F(9)—C(6)—C(3) | 113.7(9) |
| F(8)—C(6)—C(3) | 110.5(10) |
| C(9S)—C(8S)—C(13S) | 120.0 |
| C(9S)—C(8S)—C(14S) | 119.98(6) |
| C(13S)—C(8S)—C(14S) | 119.98(6) |
| C(8S)—C(9S)—C(10S) | 120.0 |
| C(11S)—C(10S)—C(9S) | 120.0 |
| C(12S)—C(11S)—C(10S) | 120.0 |
| C(13S)—C(12S)—C(11S) | 120.0 |
| C(12S)—C(13S)—C(8S) | 120.0 |
| C(2S)—C(1S)—C(6S) | 120.0 |
| C(2S)—C(1S)—C(7S) | 119.99(5) |
| C(6S)—C(1S)—C(7S) | 119.98(5) |
| C(1S)—C(2S)—C(3S) | 120.0 |
| C(2S)—C(3S)—C(4S) | 120.0 |
| C(3S)—C(4S)—C(5S) | 120.0 |
| C(6S)—C(5S)—C(4S) | 120.0 |
| C(5S)—C(6S)—C(1S) | 120.0 |

Symmetry transformations used to generate equivalent atoms:
1 −x + 2, −y + 1, z
2 −x + 2, y − 1/2, −z + 1/4
3 y + 0, x − 1/2, z + 1/4
4 y − 1/2, −x + 1/2, −z + 1/2
5 −y + 1/2, x + 1/2, −z + 1/2
6 −x, −y + 1, z
7 y + 1/2, x, z − 1/4
8 −x + 2, y + 1/2, −z + 1/4

TABLE 7

Crystal data and structure refinement for FMOF-2•4Toluene.

| | |
|---|---|
| Empirical formula | $C_{52}H_{32}Ag_6F_{36}N_{18}$ |
| Formula weight | 2240.18 |
| Temperature | 100(2) K |
| Wavelength | 0.71073 Å |
| Crystal system | Hexagonal |
| Space group | P6/m |
| Unit cell dimensions | a = 23.4261(14) Å    α = 90°. |
| | b = 23.4261(14) Å    β = 90°. |
| | c = 12.2033(15) Å    γ = 120°. |
| Volume | 5799.7(9) Å$^3$ |
| Z | 6 |
| Density (calculated) | 1.924 Mg/m$^3$ |
| Absorption coefficient | 1.623 mm$^{-1}$ |
| F(000) | 3228 |
| Crystal size | 0.27 × 0.18 × 0.13 mm$^3$ |
| Theta range for data collection | 2.41 to 25.05°. |
| Index ranges | −27 <= h <= 27, −27 <= k <= 27, −14 <= l <= 14 |
| Reflections collected | 59555 |
| Independent reflections | 3606 [R(int) = 0.0447] |
| Completeness to theta = 25.05° | 99.7% |
| Absorption correction | Semi-empirical from equivalents |
| Max. and min. transmission | 0.8216 and 0.6702 |
| Refinement method | Full-matrix least-squares on F$^2$ |
| Data/restraints/parameters | 3606/135/320 |
| Goodness-of-fit on F$^2$ | 1.459 |
| Final R indices [I > 2sigma(I)] | R1 = 0.0640, wR2 = 0.1639 |
| R indices (all data) | R1 = 0.0735, wR2 = 0.1732 |
| Largest diff. peak and hole | 1.863 and −1.966 e · Å$^{-3}$ |

TABLE 8

Atomic coordinates (× 10$^4$) and equivalent isotropic displacement parameters (Å$^2$ × 10$^3$) for FMOF-2•4Toluene.

| | x | y | z | U(eq) |
|---|---|---|---|---|
| Ag(1) | −4689(1) | 5911(1) | 0 | 26(1) |
| Ag(2) | −2075(1) | 5540(1) | 0 | 23(1) |
| Ag(3) | −1099(1) | 5997(1) | 5000 | 50(1) |
| N(1) | −3981(4) | 5502(5) | 0 | 21(2) |
| N(2) | −4211(5) | 4840(5) | 0 | 24(2) |
| N(3) | −3107(5) | 5360(5) | 0 | 24(2) |
| N(4) | −1528(3) | 5663(3) | 1544(6) | 24(2) |
| N(5) | −946(3) | 5655(4) | 1587(6) | 26(2) |
| N(6) | −1133(3) | 5908(4) | 3271(6) | 29(2) |
| C(1) | −3330(5) | 5785(5) | 0 | 19(2) |
| C(2) | −2892(6) | 6519(6) | 0 | 26(2) |
| F(1) | −2993(3) | 6793(3) | 863(7) | 68(2) |
| F(2) | −2262(3) | 6693(3) | 0 | 41(2) |
| C(3) | −3668(5) | 4787(5) | 0 | 24(3) |
| C(4) | −3686(6) | 4138(7) | 0 | 35(3) |
| F(4) | −3380(3) | 4079(3) | 858(7) | 59(2) |
| F(5) | −4291(4) | 3645(4) | 0 | 92(5) |
| C(5) | −736(4) | 5810(5) | 2583(8) | 33(2) |
| C(6) | −108(4) | 5880(4) | 2981(6) | 52(3) |
| F(10) | −112(9) | 5681(6) | 3992(7) | 28(2) |

TABLE 8-continued

Atomic coordinates (× 10⁴) and equivalent isotropic displacement parameters ($Å^2 \times 10^3$) for FMOF-2•4Toluene.

| | x | y | z | U(eq) |
|---|---|---|---|---|
| F(11) | 427(5) | 6428(5) | 2773(11) | 60(3) |
| F(12) | −4(5) | 5411(5) | 2362(8) | 44(2) |
| F(10A) | −182(8) | 5476(5) | 3793(7) | 28(2) |
| F(11A) | 238(5) | 6512(4) | 3521(10) | 60(3) |
| F(12A) | 305(5) | 5920(6) | 2262(7) | 44(2) |
| C(7) | −1612(4) | 5811(4) | 2561(8) | 28(2) |
| C(8) | −2196(5) | 5880(6) | 2871(8) | 43(3) |
| F(7) | −2195(5) | 6368(5) | 2347(8) | 97(3) |
| F(8) | −2264(4) | 5920(5) | 3898(6) | 74(3) |
| F(9) | −2754(3) | 5361(5) | 2524(7) | 86(3) |
| C(1S) | −1839(8) | 4213(8) | 4456(13) | 92(8) |
| C(2S) | −2379(8) | 4292(7) | 4665(14) | 63(6) |
| C(3S) | −2565(6) | 4313(7) | 5739(17) | 74(7) |
| C(4S) | −2212(10) | 4254(9) | 6604(13) | 63(6) |
| C(5S) | −1672(9) | 4175(8) | 6395(15) | 67(5) |
| C(6S) | −1486(6) | 4155(6) | 5321(17) | 68(5) |
| C(7S) | −1641(17) | 4193(17) | 3304(17) | 128(12) |
| C(9S) | −525(11) | 7654(10) | 3120(20) | 130(9) |
| C(10S) | −933(10) | 7646(11) | 3950(20) | 144(9) |
| C(11S) | −809(13) | 7556(12) | 5030(20) | 135(9) |
| C(12S) | −275(15) | 7474(12) | 5280(20) | 140(10) |
| C(13S) | 133(12) | 7481(13) | 4450(20) | 129(9) |
| C(14S) | 8(11) | 7571(12) | 3370(20) | 134(9) |
| C(15S) | −659(18) | 7752(17) | 1960(20) | 130(10) |

U(eq) is defined as one third of the trace of the orthogonalized $U^{ij}$ tensor.

TABLE 9

Bond lengths [Å] and angles [°] for FMOF-2•4Toluene.

| | |
|---|---|
| Ag(1)—N(2)#1 | 2.281(10) |
| Ag(1)—N(1) | 2.292(9) |
| Ag(1)—N(5)#2 | 2.389(8) |
| Ag(1)—N(5)#3 | 2.389(8) |
| Ag(2)—N(4)#4 | 2.215(8) |
| Ag(2)—N(4) | 2.215(8) |
| Ag(2)—N(3) | 2.237(9) |
| Ag(3)—N(6) | 2.118(8) |
| Ag(3)—N(6)#5 | 2.118(8) |
| N(1)—C(1) | 1.325(14) |
| N(1)—N(2) | 1.365(13) |
| N(2)—C(3) | 1.338(14) |
| N(2)—Ag(1)#1 | 2.281(10) |
| N(3)—C(3) | 1.328(15) |
| N(3)—C(1) | 1.335(14) |
| N(4)—C(7) | 1.330(12) |
| N(4)—N(5) | 1.374(9) |
| N(5)—C(5) | 1.293(13) |
| N(5)—Ag(1)#6 | 2.389(8) |
| N(6)—C(7) | 1.344(11) |
| N(6)—C(5) | 1.355(12) |
| C(1)—C(2) | 1.499(15) |
| C(2)—F(1) | 1.313(10) |
| C(2)—F(1)#4 | 1.313(10) |
| C(2)—F(2) | 1.320(14) |
| C(3)—C(4) | 1.499(16) |
| C(4)—F(5) | 1.306(15) |
| C(4)—F(4) | 1.316(10) |
| C(4)—F(4)#4 | 1.316(10) |
| C(5)—C(6) | 1.476(12) |
| C(6)—F(12A) | 1.276(8) |
| C(6)—F(11) | 1.294(8) |
| C(6)—F(10) | 1.318(9) |
| C(6)—F(10A) | 1.322(9) |
| C(6)—F(11A) | 1.442(9) |
| C(6)—F(12) | 1.452(9) |
| C(7)—C(8) | 1.504(12) |
| C(8)—F(8) | 1.272(12) |
| C(8)—F(7) | 1.309(13) |
| C(8)—F(9) | 1.333(14) |
| C(1S)—C(2S) | 1.3900 |
| C(1S)—C(6S) | 1.3900 |

TABLE 9-continued

Bond lengths [Å] and angles [°] for FMOF-2•4Toluene.

| | |
|---|---|
| C(1S)—C(7S) | 1.488(11) |
| C(2S)—C(3S) | 1.3900 |
| C(3S)—C(4S) | 1.3900 |
| C(4S)—C(5S) | 1.3900 |
| C(5S)—C(6S) | 1.3900 |
| C(9S)—C(10S) | 1.3900 |
| C(9S)—C(14S) | 1.3900 |
| C(9S)—C(15S) | 1.495(11) |
| C(10S)—C(11S) | 1.3900 |
| C(11S)—C(12S) | 1.3900 |
| C(12S)—C(13S) | 1.3900 |
| C(13S)—C(14S) | 1.3900 |
| N(2)#1—Ag(1)—N(1) | 116.9(3) |
| N(2)#1—Ag(1)—N(5)#2 | 113.0(2) |
| N(1)—Ag(1)—N(5)#2 | 102.3(2) |
| N(2)#1—Ag(1)—N(5)#3 | 113.0(2) |
| N(1)—Ag(1)—N(5)#3 | 102.3(2) |
| N(5)#2—Ag(1)—N(5)#3 | 108.3(3) |
| N(4)#4—Ag(2)—N(4) | 116.5(3) |
| N(4)#4—Ag(2)—N(3) | 121.70(17) |
| N(4)—Ag(2)—N(3) | 121.70(17) |
| N(6)—Ag(3)—N(6)#5 | 170.1(4) |
| C(1)—N(1)—N(2) | 105.6(9) |
| C(1)—N(1)—Ag(1) | 133.1(8) |
| N(2)—N(1)—Ag(1) | 121.3(7) |
| C(3)—N(2)—N(1) | 104.6(9) |
| C(3)—N(2)—Ag(1)#1 | 133.5(7) |
| N(1)—N(2)—Ag(1)#1 | 121.9(7) |
| C(3)—N(3)—C(1) | 101.3(9) |
| C(3)—N(3)—Ag(2) | 128.3(7) |
| C(1)—N(3)—Ag(2) | 130.4(8) |
| C(7)—N(4)—N(5) | 104.2(7) |
| C(7)—N(4)—Ag(2) | 132.5(5) |
| N(5)—N(4)—Ag(2) | 123.0(6) |
| C(5)—N(5)—N(4) | 105.8(7) |
| C(5)—N(5)—Ag(1)#6 | 135.3(6) |
| N(4)—N(5)—Ag(1)#6 | 118.7(6) |
| C(7)—N(6)—C(5) | 99.1(7) |
| C(7)—N(6)—Ag(3) | 130.2(6) |
| C(5)—N(6)—Ag(3) | 129.7(6) |
| N(1)—C(1)—N(3) | 114.1(10) |
| N(1)—C(1)—C(2) | 122.0(10) |
| N(3)—C(1)—C(2) | 123.8(10) |
| F(1)—C(2)—F(1)#4 | 106.6(11) |
| F(1)—C(2)—F(2) | 107.2(7) |
| F(1)#4—C(2)—F(2) | 107.2(7) |
| F(1)—C(2)—C(1) | 111.9(7) |
| F(1)#4—C(2)—C(1) | 111.9(7) |
| F(2)—C(2)—C(1) | 111.9(10) |
| N(3)—C(3)—N(2) | 114.3(9) |
| N(3)—C(3)—C(4) | 122.5(10) |
| N(2)—C(3)—C(4) | 123.2(10) |
| F(5)—C(4)—F(4) | 108.3(8) |
| F(5)—C(4)—F(4)#4 | 108.3(8) |
| F(4)—C(4)—F(4)#4 | 105.4(10) |
| F(5)—C(4)—C(3) | 111.5(9) |
| F(4)—C(4)—C(3) | 111.6(8) |
| F(4)#4—C(4)—C(3) | 111.6(8) |
| N(5)—C(5)—N(6) | 115.6(8) |
| N(5)—C(5)—C(6) | 123.9(8) |
| N(6)—C(5)—C(6) | 120.4(9) |
| F(11)—C(6)—F(10) | 111.4(9) |
| F(12A)—C(6)—F(10A) | 112.9(8) |
| F(12A)—C(6)—F(11A) | 102.8(7) |
| F(10A)—C(6)—F(11A) | 101.4(7) |
| F(11)—C(6)—F(12) | 101.6(7) |
| F(10)—C(6)—F(12) | 101.1(7) |
| F(12A)—C(6)—C(5) | 117.3(8) |
| F(11)—C(6)—C(5) | 117.7(9) |
| F(10)—C(6)—C(5) | 116.1(10) |
| F(10A)—C(6)—C(5) | 113.6(10) |
| F(11A)—C(6)—C(5) | 106.5(8) |
| F(12)—C(6)—C(5) | 106.2(8) |
| N(4)—C(7)—N(6) | 115.2(8) |
| N(4)—C(7)—C(8) | 121.6(8) |
| N(6)—C(7)—C(8) | 123.2(9) |
| F(8)—C(8)—F(7) | 111.3(10) |
| F(8)—C(8)—F(9) | 106.2(10) |

TABLE 9-continued

Bond lengths [Å] and angles [°] for FMOF-2•4Toluene.

| | |
|---|---|
| F(7)—C(8)—F(9) | 102.4(10) |
| F(8)—C(8)—C(7) | 114.2(9) |
| F(7)—C(8)—C(7) | 111.5(9) |
| F(9)—C(8)—C(7) | 110.5(9) |
| C(2S)—C(1S)—C(6S) | 120.0 |
| C(2S)—C(1S)—C(7S) | 119.8(4) |
| C(6S)—C(1S)—C(7S) | 120.2(4) |
| C(3S)—C(2S)—C(1S) | 120.0 |
| C(4S)—C(3S)—C(2S) | 120.0 |
| C(3S)—C(4S)—C(5S) | 120.0 |
| C(4S)—C(5S)—C(6S) | 120.0 |
| C(5S)—C(6S)—C(1S) | 120.0 |
| C(10S)—C(9S)—C(14S) | 120.0 |
| C(10S)—C(9S)—C(15S) | 120.0(4) |
| C(14S)—C(9S)—C(15S) | 120.0(4) |
| C(9S)—C(10S)—C(11S) | 120.0 |
| C(10S)—C(11S)—C(12S) | 120.0 |
| C(13S)—C(12S)—C(11S) | 120.0 |
| C(14S)—C(13S)—C(12S) | 120.0 |
| C(13S)—C(14S)—C(9S) | 120.0 |

Symmetry transformations used to generate equivalent atoms:
1 −x − 1, −y + 1, −z
2 y − 1, −x + y, z
3 y − 1, −x + y, −z
4 x, y, −z
5 x, y, −z + 1
6 −y + 1, x + 1, −z Example 4

TGA Analysis

Figure 20:
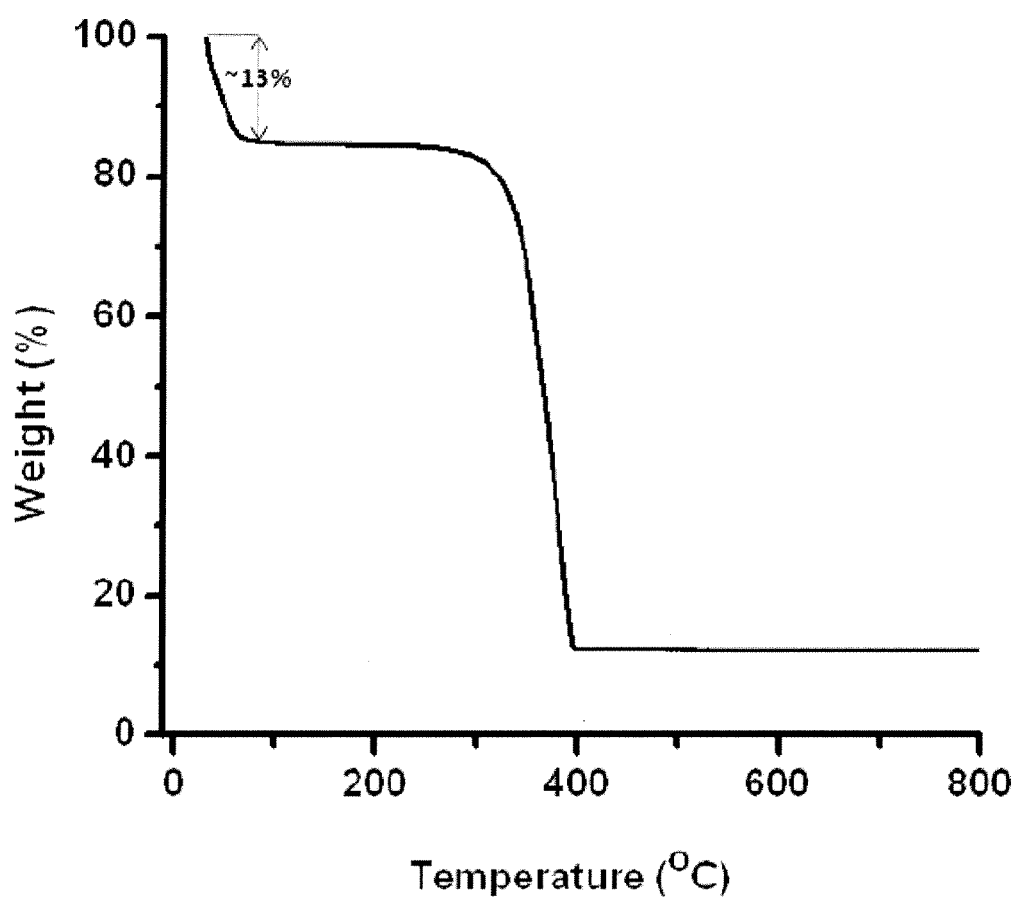
FIG. 20 shows TGA of the toluene-adsorbed FMOF-1.
Figure 21:
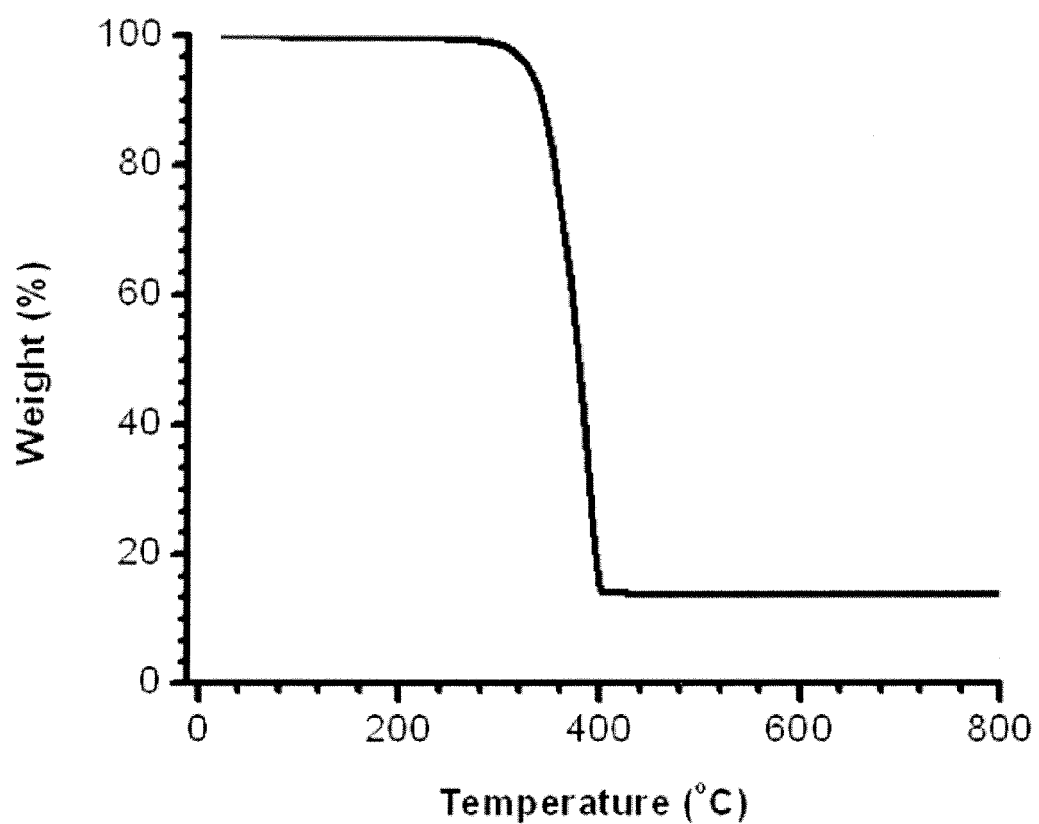
FIG. 21 shows TGA of desolvated FMOF-1.

The thermal stability of FMOF-1 and its toluene solvate was examined by TGA and single crystal X-ray diffraction. Under an air atmosphere, TGA of toluene soaked FMOF-1 (FIG. 20) reveals a weight loss of 13% from 30 to 125° C., corresponding to 8 toluene molecules per unit cell, consistent with the toluene vapor adsorption data shown in FIG. 1b in the main manuscript. There is no further weight loss from 125 to 300° C. (FIG. 20). Upon further heating, the obvious weight loss above 310° C. corresponds to the sublimation and decomposition of FMOF-1. At 400° C., the overall weight loss of 85% for FMOF-1 indicates partial evaporation and decomposition. The guest molecules in FMOF-1 can be easily removed by heating at 100° C. under vacuum for 1 h, which can be verified by TGA on the desolvated FMOF-1. The fully desolvated FMOF-1 exhibits no obvious weight loss from 30 to 300° C. (FIG. 21).

Example 5

Preparation of 1,2-bis(trifluoroacetyl)hydrazine

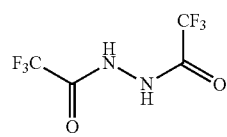

Trifluoroacetic acid (7.6 mL, 0.1 mol) was added to a stirred solution of trifluoroacethydrazide (12.8 g, 0.1 mol) in benzene (100 mL) and the mixture was heated under reflux for 2 h. A Dean and Stark trap was fitted, and reflux was continued for 3 h. Reflux was continued in the absence of the Dean and Stark trap (3 h) and then with the trap refitted (20 h). The resulting white solid was collected by filtration, dried in vacuum and identified as 1,2-bis(trifluoroacetyl)hydrazine (16.5 g, 73%). M.p. 173-175° C.

Example 6

Preparation of 2,5-dichloro-1,1,1,6,6,6-hexafluoro-3,4-diazahexa-2,4-diene

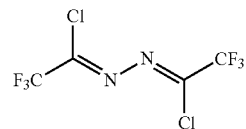

A mixture of N,N-diethylaniline hydrochloride (18.5 g, 0.1 mol), 1,2-bis(trifluoroacetyl)hydrazine (10.3 g, 0.46 mol) and phosphoryl chloride (160 mL) was stirred for 30 minutes under nitrogen in a flask fitted with a condenser leading to a cold trap (−78° C.). The mixture was heated under reflux for 5 h and then allowed to cool and stored overnight. The flask contents and the small amount of material which had condensed in the cold trap were combined and the two layers which had formed were separated. The layer was added to ice water (85 mL) and the mixture vigorously stirred for 1 h in a flask fitted with a condenser. Separation of the lower organic layer gave the main batch of the crude product (6.4 g). The original dark upper layer was treated similarly with ice water (75 mL) and the organic layer subjected to preliminary purification by trap-to-trap distillation in vacuum to afford a second batch of crude product (1.6 g). Distillation of the combined product through a vacuum-jacketed Vigreux column gave 2,5-dichloro-1,1,1,6,6,6-hexafluoro-3,4-diazahexa-2,4-diene (6.3 g, 53%) as an oil.

Example 7

Preparation of (ZZ)-1-amino-5-chloro-1,1,1,6,6,6-hexafluoro-3,4-diazahexa-2,4-diene

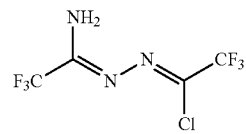

A solution containing aqueous ammonia (0.78 g, 45.9 mmol) in diethyl ether (30 mL) was added slowly over 1 h to a stirred solution of 2,5-dichloro-1,1,1,6,6,6-hexafluoro-3,4-diazahexa-2,4-diene (6.0 g, 23.0 mmol) in diethyl ether (60 mL) and water (30 mL) at 0° C., and stirring was continued for 3 h. The ether layer was separated, dried over Na₂SO₄ and the ether removed in vacuo to give (ZZ)-1-amino-5-chloro-1,1,1,6,6-hexafluoro-3,4-diazahexa-2,4-diene. Yield: 3.6 g (64%).

Example 8

Preparation of 3,5-bis(trifluoromethyl)-1H-1,2,4-triazole

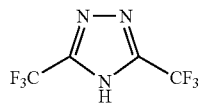

A solution of (ZZ)-1-amino-5-chloro-1,1,1,6,6,6-hexafluoro-3,4-diazahexa-2,4-diene (5.0 g, 20.7 mmol) in THF (20 mL) was heated under reflux for 3 days and the solvent was removed under reduced pressure to give a waxy solid. Purification by column (eluant: $CHCl_3$) affords 3,5-bis(trifluoromethyl)-1H-1,2,4-triazole as a colorless crystal. Yield: 1.0 g, 25%. M.p. 74-75° C.

Example 9

Preparation of sodium 3,5-bis(trifluoromethyl)-1,2,4-triazolate

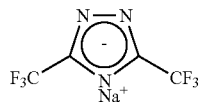

Sodium hydride (0.24 g, 0.01 mol) was added to 10 mL of anhydrous acetonitrile contained in a three-necked flask fitted with a nitrogen inlet, a dropping funnel and a condenser surmounted with a drying tube ($CaCl_2$). An equivalent amount of 3,5-bis(trifluoromethyl)-1H-1,2,4-triazole (2.0 g, 0.01 mmol) in 5.0 mL of anhydrous acetonitrile was added from the dropping funnel and the mixture stirred at room temperature for 24 h under a nitrogen atmosphere. Solvent was then removed in vacuo and the white residue of the sodium triazolide was used in the following reaction without separation.

Example 10

Preparation of FMOF-1 (FIG. 3)

$AgClO_4 \cdot H_2O$ (225 mg, 1.0 mmol) and the above sodium triazolide (250 mg, 1.1 mmol) in 30 mL of MeOH was stirred for 6 h and finally concentrated under reduced pressure to a small volume. Water was added to the residue and the precipitated colorless solid was filtered, washed with water and dried at 60° C. in vacuum to afford colorless crystalline solid. Recrystallization from acetonitrile-toluene afford colorless crystals of FMOF-1, yield: 153 mg (49%).

The procedures above can be generally used in the synthesis of other flourinated triazole ligands and related fluorous metal organic frameworks. For example, the $R_F$ in FIG. 2 can be replaced by longer flourinated alkyl groups or flourinated aromatic groups instead of $CF_3$.

REFERENCES

The following publications are hereby incorporated by reference.

OTHER PUBLICATIONS

Abdul-Ghani, M. M.; Tipping, A. E. *J. Fluo. Chem.* 1995, 72, 95.
Brooks III. C. L.; Onuchic, J. N.; Wales, D. J. *Science* 2001, 293, 612.
Chandler, D. *Nature* 2002, 417, 491.
Desbiens, N.; Boutin, A.; Demachy, I. *J. Phys. Chem. B* 2005, 109, 24071.
Eddaoudi, M.; Li, H.; Yaghi, O. M. *J. Am. Chem. Soc.* 2000, 122, 1391.
Eddaoudi, M.; Moler, D. B.; Li, H.; Chen, B.; Reineke, T. M.; O'Keeffe, M.; Yaghi, O. M. *Acc. Chem. Res.* 2001, 34, 319.
Larmour, I. A.; Bell, S. E. J.; Saunders, G. C. *Angeew. Chem. Int. Ed.* 2007, 46, 1710 and references therein.
Lee. J. Y.; Olson, D. H.; Pan, L. Emge, T. J.; Jing Li *J. Adv. Funct. Mater.* 2007, 17, 1255.
Li, J.-R.; Yakovenko, A. A.; Lu, W.; Timmons, D. J.; Zhuang, W.; Yuan, D.; Zhou, H.-C. *J. Am. Chem. Soc.,* 2010, 132, 17599.
Lin, X.; Blake, A. J.; Wilson, C.; Sun, X. Z.; Champness, N. R.; George, M. W.; Hubberstey, P.; Mokaya. R.; Schröder, M. *J. Am, Chem. Soc.* 2006, 128, 10745.
Long et al., *J. Am. Chem. Soc.* 2006, 128, 16876.
Low, J. J.; Benin, A. I.; Jakubczak, P.; Abrahamian, J. F.; Faheem, S. A.; Willis, R. R. *J. Am. Chem. Soc.* 2009, 131, 15834.
Moïse, J.-C.; Bellat, J.-P.; Méthivier, A. *Microporous Mesoporous Mater.* 2001, 43, 91.
Nishihara, H.; Fukura. Y.; Inde, K.; Tsuji, K.; Takeuchi, M.; Kyotani. T. *Carbon* 2008, 46, 48.
Ohara, K.; Marti-Rujas, J.; Haneda, T.; Kawano, M.; Hashizume, D.; Izumi, F.; Fujita, M. *J. Am. Chem. Soc.* 2009, 131, 3860.
Ouellette, W.; Yu, M. H.; O'Connor, C. J.; Hagman, D.; Zubieta, J. *Angew. Chem. Int. Ed.* 2006, 45, 3497.
Pan, L.; Olson, D. H.; Ciemnolonski, L. R.; Heddy, R.; Li, *J. Angew. Chem., Int. Ed.* 2006, 45, 616.
Smit, B., Maesen. T. L. M. *Nature,* 1995, 374, 42.
Spek, A. L. *J. Appl. Crystallogr.* 2003, 36, 7.
Taylor, T. J.; Bakhmutov, V. I.; Gabbai, F. P. *Angew. Chem. Int. Ed.* 2006, 45, 7030.
Trung, T. K., Trens, P., Tanchoux, N., Bourrelly, S., Llewellyn, P. L., Loera-Serna, S., Serre, C., Loiseau, T., Fajula, F. and Férey, G. *J. Am. Chem. Soc.* 2008, 130, 16926.
Webster, C. E.; Drago, R. S.; Zerner, M. C. *J. Am. Chem. Soc.* 1998, 120, 5509.
Yaghi, O. M.; Li, G. M.; Li, H. L. *Nature* 1995, 378, 703.
Yaghi et al., *J. Am. Chem. Soc.* 2006, 128, 3494.
Yang, C.; Wang, X.; Omary, M. A., *J. Am. Chem. Soc.* 2007, 129, 15454.
Yang, C.; Wang, X.; Omary, M. A. *Angew. Chem. Int. Ed.* 2009, 48, 2500; *Angew. Chem.* 2009, 121, 2538.
Yang, G.; Raptis, R. G. *Chem. Commun.* 2004, 2058.
Zhang, J. P.; Zhang, S. L. Huang, X.-C.; Chen, X.-M. *Angew. Chem. Int. Ed.* 2004, 43, 206.
Zhang, J. P.; Lin, Y.-Y.; Huang, X.-C.; Chen, X.-M. *J. Am. Chem. Soc.* 2005, 127, 5495.
Zhang, J. P.; Lin, Y.-Y.; Zhang, W.-X.; Chen, X.-M. *J. Am. Chem. Soc.* 2005, 127, 14162.

What is claimed is:
1. A method for adsorbing hydrocarbons, comprising:
contacting the hydrocarbons with fluorinated metal-organic frameworks, wherein the fluorinated metal-organic frameworks comprise:
a plurality of metal clusters, each metal cluster comprising one or more metal ions; and a plurality of linking ligands, wherein the linking ligands connect adjacent metal clusters to form a coordination polymer, wherein hydrogen atoms are substituted completely by fluorine atoms in each ligand, wherein the fluorinated metal-organic frameworks have 3-D, 2-D, or 1-D structures, wherein the fluorinated metal-organic frameworks adsorb the hydrocarbons, wherein the clusters are assembled into coordination polymers having a plurality of open-ended, hollow channels and internal cavities with hydrophobic internal areas, and wherein the open-ended, hollow channels and internal cavities are capable of reversibly adsorbing and desorbing gases.

2. The method of claim 1, wherein the metal clusters comprise $Li^+$, $Na^+$, $K^+$, $Rb^+$, $Be^{2+}$, $Mg^{2+}$, $Ca^{2+}$, $Sr^{2+}$, $Ba^{2+}$, $Sc^{2+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Pd^{2+}$, $Pd^0$, $Pt^{2+}$, $Pt^0$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$, and combinations thereof.

3. The method of claim 1, wherein the linking ligands comprise triazolates, carboxylates, polypyridines, phosphines, or thiolates.

4. The method of claim 1, wherein the metal clusters comprise $Ag^+$ and the linking ligands comprise triazolates.

5. The method of claim 1, wherein the open-ended, hollow channels and internal cavities are free of solvent molecules.

6. The method of claim 1, wherein the hydrocarbons are hexane, cyclohexane, benzene, toluene, or mixtures thereof.

7. The method of claim 1, wherein the fluorinated metal-organic frameworks are capable of desorbing hydrocarbons.

8. The method of claim 1, further comprising the step of desorbing the hydrocarbons.

9. The method of claim 8, wherein the hydrocarbons are desorbed by decreasing pressure and/or increasing temperature.

10. The method of claim 1, wherein the metal clusters and the linking ligands are assembled into coordination polymers having a 3D network structure.

11. The method of claim 1, wherein the fluorinated metal-organic frameworks have densities in the range of about 1.6 g/mL to about 2.2 g/mL.

12. The method of claim 1, wherein the fluorinated metal-organic frameworks have volumetric storage capacities for gases that exceeds their gravimetric storage capacities for gases.

13. A storage device for hydrocarbons, comprising the fluorinated metal-organic frameworks of claim 1.

14. A method for adsorbing hydrocarbons, comprising:
contacting the hydrocarbons with fluorinated metal-organic frameworks, wherein the fluorinated metal-organic frameworks comprise:
a plurality of metal clusters, each metal cluster comprising one or more $Ag^+$ ions; and
a plurality of linking ligands, wherein the linking ligands comprise triazolates,
wherein the linking ligands connect adjacent metal clusters to form a coordination polymer, wherein hydrogen atoms are substituted completely or partially by fluorine atoms in each ligand, wherein the fluorinated metal-organic frameworks have 3-D, 2-D, or 1-D structures, and wherein the fluorinated metal-organic frameworks adsorb the hydrocarbons.

* * * * *